US007094285B2

(12) United States Patent
Mazany et al.

(10) Patent No.: US 7,094,285 B2
(45) Date of Patent: Aug. 22, 2006

(54) INORGANIC MATRIX COMPOSITIONS, COMPOSITES INCORPORATING THE MATRIX, AND PROCESS OF MAKING THE SAME

(75) Inventors: Anthony M. Mazany, Amelia Island, FL (US); John W. Robinson, Ferandina Beach, FL (US); Craig L. Cartwright, Jacksonville, FL (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/777,885

(22) Filed: Feb. 12, 2004

(65) Prior Publication Data

US 2004/0182285 A1     Sep. 23, 2004

Related U.S. Application Data

(63) Continuation-in-part of application No. 09/871,765, filed on Jun. 1, 2001, and a continuation-in-part of application No. 09/871,998, filed on Jun. 1, 2001.

(60) Provisional application No. 60/233,952, filed on Sep. 20, 2000, provisional application No. 60/233,985, filed on Sep. 20, 2000.

(51) Int. Cl.
  *C04B 12/04* (2006.01)
(52) U.S. Cl. ........................................ 106/600; 252/62
(58) Field of Classification Search ................ 106/600; 252/62
  See application file for complete search history.

(56) References Cited

U.S. PATENT DOCUMENTS

| | | | |
|---|---|---|---|
| 2,964,415 A | 12/1960 | Payne, Jr. et al. |
| 3,933,689 A | 1/1976 | Ray et al. |
| 3,934,066 A | 1/1976 | Murch et al. |
| 3,935,018 A | 1/1976 | Ray et al. |
| 3,964,919 A | 6/1976 | Ray et al. |
| 3,989,532 A | 11/1976 | Ray et al. |
| 4,064,317 A | 12/1977 | Fukuba et al. |
| 4,159,302 A | 6/1979 | Greve et al. |
| 4,270,326 A | 6/1981 | Holter et al. |
| 4,284,664 A | 8/1981 | Rauch, Sr. |
| 4,297,252 A | 10/1981 | Caesar et al. |
| 4,299,872 A | 11/1981 | Miguel et al. |
| 4,472,199 A | 9/1984 | Davidovits |
| 4,509,559 A | 4/1985 | Cheetham et al. |
| 4,509,985 A | 4/1985 | Davidovits et al. |
| 4,533,393 A | 8/1985 | Neuschaeffer et al. |
| 4,675,577 A | 6/1987 | Hanlet |
| 4,729,916 A | 3/1988 | Feldman |
| 4,756,945 A | 7/1988 | Gibb |
| 4,767,656 A | 8/1988 | Chee et al. |
| 4,799,349 A | 1/1989 | Luckanuck |
| 4,801,496 A | 1/1989 | Buchacher |
| 4,818,595 A | 4/1989 | Ellis |
| 4,879,320 A | 11/1989 | Hastings |
| 4,888,311 A | 12/1989 | Davidovits et al. |
| 4,936,064 A | 6/1990 | Gibb |
| 4,936,939 A | 6/1990 | Woolum |
| 5,053,282 A | 10/1991 | Delvaux et al. |
| 5,130,184 A | 7/1992 | Ellis |
| 5,215,806 A | 6/1993 | Bailey |
| 5,258,216 A | 11/1993 | von Bonin et al. |
| 5,288,321 A | 2/1994 | Davidovits |
| 5,352,427 A | 10/1994 | Davidovits et al. |
| 5,476,891 A | 12/1995 | Welna |
| 5,498,466 A | 3/1996 | Navarro et al. |
| 5,539,140 A | 7/1996 | Davidovits et al. |
| 5,580,648 A | 12/1996 | Castle et al. |
| 5,722,213 A | 3/1998 | Morency |
| 5,786,095 A | 7/1998 | Batdorf |
| 5,798,307 A | 8/1998 | Davidovits et al. |
| 6,139,619 A * | 10/2000 | Zaretskiy et al. ........... 106/629 |
| 6,182,470 B1 | 2/2001 | Guillard |
| 6,240,691 B1 | 6/2001 | Holzkaemper et al. |
| 6,270,915 B1 | 8/2001 | Turpin et al. |
| 6,296,699 B1 * | 10/2001 | Jin .............................. 106/814 |
| 6,340,389 B1 | 1/2002 | Klus |
| 6,419,737 B1 * | 7/2002 | Haji ........................... 106/600 |

FOREIGN PATENT DOCUMENTS

| | | |
|---|---|---|
| DE | 2029 | 12/1971 |
| DE | 32 46 604 | 6/1984 |
| EP | 0 674 089 | 9/1995 |

(Continued)

OTHER PUBLICATIONS

Chemical Abstracts, vol. 85, No. 8, Aug. 23, 1976; abstract No. 51069s, M. Tanaka: "Nonflammable inorganic foam" XP000063264.

(Continued)

*Primary Examiner*—Paul Marcantoni
(74) *Attorney, Agent, or Firm*—Hudak, Shunk & Farine Co. LPA

(57) ABSTRACT

A modified alkali silicate composition for forming an inorganic polymer matrix having improved mechanical properties. The modified alkali silicate matrix is made by reacting an alkali silicate (or its precursors such as an alkali hydroxide, a $SiO_2$ source and water), a non-silicate network former and/or reactive glass, water and optionally one or more multivalent cation(s) selected from Groups 2, 3, 4, 5, 6, 7, 8, 9, 10, 11, 12, 13, 14, 15 or 16 of the periodic table such as an alkaline earth salt, water and optional processing aids. An inorganic matrix composite can be prepared by applying a slurry of the modified aqueous alkali silicate composition to a reinforcing medium and curing the composite at a temperature from about 15° C. up to 1000° C. and a pressure of up to 20,000 psi for typical high-performance organic polymer processing (temperatures about 15° C. to about 200° C. and pressures <200 psi). The composite can be shaped by compression molding as well as other known fabrication methods.

98 Claims, No Drawings

FOREIGN PATENT DOCUMENTS

| | | |
|---|---|---|
| WO | WO 02/24596 | 3/2002 |
| WO | WO 02/24597 | 3/2002 |

OTHER PUBLICATIONS

Chemical, Abstracts, vol. 93, No. 4, Jul. 28, 1980, abstract No. 308J0w, J. Ueda et al. "Hardening and Waterproofing soft ground" XP000063866.

Chemical Abstracts, vol. 96, No. 10, Mar. 8, 1982; abstract No. 73730e, "Hardening agent for waterglass" XP000064038.

Chemical Abstracts, vol. 103, No. 6, Aug. 1985, abstract No. 41661e, "Stabilization of weak foundations" XP000064227.

Chemical Abstracts, vol 103, No. 12, Sep. 23, 1985, abstract No. 92158d, "Strengthening of soil foundation with neutral grout" XP000064371.

* cited by examiner

INORGANIC MATRIX COMPOSITIONS, COMPOSITES INCORPORATING THE MATRIX, AND PROCESS OF MAKING THE SAME

CROSS-REFERENCE TO RELATED APPLICATIONS

This application is a continuation-in-part of U.S. patent application Ser. No. 09/871,765, filed on Jun. 1, 2001, which claims the benefit of the filing of U.S. Provisional Patent Application Ser. No. 60/233,952, entitled "Inorganic Matrix Compositions, Composites and Process of Making the Same", filed on Sep. 20, 2000, and U.S. patent application Ser. No. 09/871,998, filed on Jun. 1, 2001, which claims the benefit of the filing of U.S. Provisional Patent Application Ser. No. 60/233,985, entitled "Inorganic Matrix Compositions and Composites Incorporating the Matrix Composition", filed on Sep. 20, 2000 and the specifications thereof are incorporated herein by reference.

BACKGROUND OF THE INVENTION

The present invention relates to inorganic matrix compositions, which incorporate a silicate network and which can be processed at conditions comparable to those used for typical high-performance organic polymer processing, i.e., temperatures of about 15° C. to about 200° C. and pressures of less than about 200 psi, although a wide range of temperatures and pressures can be employed. The physical and thermal properties of the inorganic matrix binder, as well as composites, may be enhanced by elevated processing temperatures (up to 400° C. and greater) and pressures (up to 20,000 psi and greater) to produce exceptional composites and neat resin components. The composite materials formed at the lower processing conditions exhibit excellent thermal, dimensional, physical and flameproof properties.

Inorganic matrices are useful as flame retardant binders, bulk materials, adhesives, cellular materials, such as foamed materials, or composite materials. As bulk materials, they are used to form shaped objects which when cured provide a structural material. As a composite material, the matrix composition is used to impregnate a fabric, which may be combined with other similarly impregnated fabrics, to form the composite lay-up, which is then shaped and cured to form a shaped object, similar to a bulk material, but with the benefit of the reinforcement provided by the fabric.

The basic concept of composite materials has been known for centuries. Composite materials offer a unique blend of value added features, such as weight savings, electrical insulation, thermal insulation, corrosion resistance, and manufacturing cost savings. These features in some instances can overshadow the material cost in specialized applications ranging, for example, from sporting equipment to the F-22 aircraft fuselage. However, current state-of-the-art composite materials can also exhibit properties that present serious barriers to entry in some high-performance markets. These include poor flame, smoke and toxicity (FST) performance, physical degradation at high temperatures as well as higher material and processing costs. When exposed to fire or temperatures greater than about 500° C., conventional composite materials can combust and generate toxic smoke and/or gases. The exceptions, such as ceramic matrix composites and metal matrix composites, are too expensive (often more than $500/lb) to gain a significant market presence. Clearly, a market need exists for affordable high temperature-resistant, composite insulating structures.

The most familiar composite systems today are based on organic polymer matrices such as epoxy/glass fiber, epoxy/carbon fiber, polyurethane/glass fiber, PVC/glass fiber, polyimide/quartz fiber, polyester/glass fiber and nylon/glass fiber. Although organic polymer composites exhibit excellent physical and mechanical properties, they are limited with regard to flammability, smoke and gas generation and elevated service temperatures. The flammability of organic polymer-based composites can be reduced by the addition of inorganic components and/or additives. The substitution of hydrogen atoms with halogen atoms (such as for example, chlorine) in hydrocarbons and hydrocarbon polymers can significantly reduce flammability and smoke/gas generation but will degrade at temperatures greater than 250° C. and eventually incinerate at temperatures greater than 450° C. Organic thermoplastic polymers also deform at relatively low temperatures (about 100° C.–300° C.) and organic polymers designed for higher service temperatures are generally prohibitive in material and processing costs.

Other composite materials include metal matrix composites (MMC), ceramic matrix composites (CMC), carbon-carbon composites as well as other inorganic matrix composites. A composite matrix may be 100% inorganic, or it may contain some organic content. Inorganic matrix networks include ceramics, silicates, glasses, aluminum silicates, alkali aluminum silicates, potassium silicates, sodium silicates, silicon carbides, silicon nitrides, boron nitrides, alumina, cementitious materials, metals, metal alloys or other matrix materials known to those knowledgeable in the arts. Other materials can be considered include inorganic particles encapsulated with inorganic binders, organic resins filled with inorganic fillers, inorganic-organic hybrids such as silicone, and other inorganic matrix materials known to those knowledgeable in the arts.

A disadvantage of organic polymers is their deficiencies at high temperatures. The use of metals and ceramics raises additional questions with regard to thermal and electrical conductivity, weight limitations, toughness, dielectric properties, ductility, and processing options. Further, ceramics do not lend themselves to the low temperature processing procedures as contrasted with organic polymer processing.

Alkali silicates are employed as affordable inorganic matrix binder materials. See for example, U.S. Pat. Nos. 4,472,199; 4,509,985; 4,888,311; 5,288,321; 5,352,427; 5,539,140; or 5,798,307 to Davidovits; U.S. Pat. No. 4,936,939 to Woolum; or U.S. Pat. No. 4,284,664 to Rauch. However, alkali silicates typically possess a very high pH. Thus these alkali solutions are so caustic that they frequently damage glass fibers, severely degrading its strength. Furthermore, the cured composites prepared in accordance with these patents still exhibit a high pH in a solid form.

A need exists for noncombustible, temperature-resistant inorganic polymer compounds which process at temperatures and pressures typical for organics (<200° C. and <200 psi) that combines the desirable features of ceramics (non-flammability, resistance to temperatures >450° C.) and organic polymers (low-temperature processing, complex shapes).

SUMMARY OF THE INVENTION

The present invention comprises a modified inorganic polymer matrix made from a composition that is a reaction product of an alkali silicate. The modified inorganic polymer matrix of the present invention can be prepared either (1) as the reaction product of an alkali silicate, one or more non-silicate network formers such as an acidic oxoanionic compound and/or a reactive glass, water and optionally a filler, and one or more secondary network linking units (such as a multivalent cation(s) selected from Groups 2, 3, 4, 5, 6, 7, 8, 9, 10, 11, 12, 13, 14, 15 or 16 such as an alkaline earth salt) or (2) as the reaction product of an alkali base, a silica source and water as well as the non-silicate network formers and network modifiers, or a combinations of these. Furthermore, the modified inorganic polymer matrix can be achieved using an aqueous slurry of an alkali silicate (or its precursors), a reactive glass and water as well as gel inhibitors and other network forming materials and modifiers. The ability to vary these "building blocks" enables one to tailor product properties to suit numerous high-temperature applications. The composition can incorporate other network forming materials, modifiers and fillers.

The thermally resistant inorganic polymer matrix compositions of the present invention incorporate a silicate network which can be processed within a wide range of temperatures and pressures. A useful feature of this invention is the ability to produce high-temperature resin and composite parts capable of withstanding temperatures of about 1000° C. and higher that are noncombustible. The inorganic polymer matrix composition as well as the composites made from the composition exhibit some properties generally restricted to ceramics but are cured at temperatures typical for organic polymer compositions. In addition, the cured inorganic polymer matrix composition is not as basic as are most alkali silicate systems and if desired, can be formulated to be near neutral with a typical pH below 8.

Alkali silicate based composites can be prepared by applying an aqueous slurry of the modified alkali silicate matrix to a reinforcing medium, such as a continuous or discontinuous glass, carbon, plated carbon, oxidized carbon, metal-coated carbon, metal-coated glass, steel, stainless steel, plated steel, polymer or other fiber tow or mat. After an optional B-staging period and/or separation(s) intended to remove excess reactants, non-polymeric products, contaminants and/or other undesired matter the composite is cured within a temperature range of about 15° C. to about 1000° C. and higher, and at a pressure sufficient to consolidate the composite, usually at an external pressure range from ambient to about 2,000 psi and under a vacuum of about ambient to about $10^{-3}$ torr (e.g., vacuum bagging). The preferred range for the temperature is between 50° C. to 200° C. and at a pressure of less than 250 psi with or without vacuum bagging. The term "B-staging" is a common term used in composite technology to describe the practice of allowing a polymer matrix precursor to react and proceed to a partially polymerized intermediate stage short of a fully cured polymer network. Vacuum bagging can also be implemented to aid water removal and consolidation. Separation methods include water, solution and/or solvent rinsing, chemical vapor and/or gaseous infiltration. The composite can be shaped by various methods including compression molding, as well as other typical molding methods.

The resulting inorganic matrix composition and/or composite exhibit thermal stability up to about 1000° C. and higher, depending upon the formulation and processing, and possess excellent properties with respect to flame, smoke and toxicity. Furthermore, a composite made according to the present invention is lightweight with good thermal and electrical insulating characteristics.

Inorganic polymer matrix compositions of the present invention are useful as fire retardant binders, bulk molding materials, sheet molding compositions, adhesives, coatings, neat resin compositions, cellular materials, such as foamed compositions or composite materials. As bulk materials, they are used to form shaped objects which when cured provide a structural material. As a composite material, the matrix composition is used to impregnate a fabric, which may be combined with other similarly impregnated fabrics to form a lay-up, which in turn is then shaped and cured to form a shaped composite or object, similar to a bulk material, but with the benefit of the reinforcement provided by the fabric. The inorganic polymer matrix can be reinforced with unidirectional tow or other nonwoven materials. The compositions of the present invention are useful in those applications where good thermal and physical stability are desired, such as those applications for which ceramic composites are used.

DETAILED DESCRIPTION OF THE INVENTION

The inorganic polymer matrix composition of the present invention is prepared by reacting an alkali silicate solution, a non-silicate network former and/or a reactive glass, water, and optionally, one or more secondary network-linking units such as multivalent cation(s) selected from Groups 2, 3, 4, 5, 6, 7, 8, 9. 10, 11, 12, 13, 14, 15 or 16 of the Periodic Table such an alkaline earth salt and optionally one or more fillers. Alternately, the reaction of a silica source, an alkali base, water, a non-silicate network formers and/or acidic reactive glass, and optionally, one or more network modifiers, and/or one or more filler(s), can yield a high-temperature inorganic polymer matrix composition. Additional components such as functional and/or nonfunctional fillers, other network forming materials and modifiers can be incorporated as needed or desired.

The modified alkali silicate composition that is obtained can be cured at relatively low temperatures (<200° C.), and at low pressures (<200 psi) to produce an inorganic polymer network having dimensional and thermal stability to 1000° C. and higher. That is, a structure incorporating the matrix composition of the present invention exhibits no substantial permanent dimensional change at temperatures to 700° C. and higher. However, it is not restricted to the lower temperature or pressure, and if needed, or desired, properties can be further enhanced utilizing elevated processing temperatures (up to 1000° C. and higher) and pressures (up to 20,000+ psi), and/or incorporating post-cure heat treatments.

An approximate chemical composition of the invention, that is a qualitative representation of the starting materials, which is derived from the aqueous mixture before curing to form the inorganic matrix, can be described as follows:

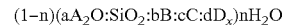

$(1-n)(aA_2O:SiO_2:bB:cC:dD_x)nH_2O$

Where:

A=(1−z) $K_2O$ or (z)$Na_2O$, where z can vary between 0 and 1, $K_2O$ is potassium oxide, and $Na_2O$ is sodium oxide, $Li_2O$ and/or an equivalent such as LiOH can also be incorporated, if desired.

$SiO_2$ is silica, which can be derived from a silica source such as Kasil-1, silica fume, silica, silica gel or a combination thereof, $H_2O$ is water, a=molar ratio of $A_2O:SiO_2$, which ranges from 0.05 to 1.0, b=molar ratio of $B:SiO_2$, which ranges from 0.001 to 0.500, c=molar ratio of $C:SiO_2$, which ranges from 0.0 to 0.250, d=is the molar ratio of $D:SiO_2$ and ranges from 0.0 to 2.000, n=molar ratio of $H_2O$ incorporated into the formulation, for which during initial formulation, the desired range is from 0.10 to 0.90, with n=0.15 to 0.35 being preferred; and after cure, n is less than 0.25, with n<0.05 being preferred, x=is the number of additives (D) used to aid in processing and performance of the basic formulation and ranges from about 0 to about 20, B=non-silicate network formers, such as phosphate, sulfate, or borate groups, derived from an acidic precursor, such as $H_3PO_4$, $H_2SO_4$, or $H_3BO_3$, a combination thereof and/or a reactive glass such as an alkaliborophosphate or an alkali phosphoborate glass, C=network modifiers such as $Mg^{2+}$, $Ca^{2+}$, $Zn^{2+}$, $Al^{3+}$, $Ti^{4+}$ derived from multivalent main group metal and/or transition metal compounds such as $Mg(NO_3)_2$, $ZnCl_2$, or a combination thereof or as a metallic component of a reactive glass, and D=optional additives selected from one or more, alone or in combination, of
  (i) reactive and/or nonreactive fillers such as but not limited to kaolin, smectites, hormites, mica, vermiculite, metakaolin, metal oxides, or a combination thereof;
  (ii) gelation modifiers such as an organic base (quinoline) and/or an organic acid (lactic acid);
  (iii) a surface-active agents such as an anionic, cationic and/or nonionic surfactant such as but not limited to alkylaryl sulfonates, quaternary ammonium salts, protonated organoamine salts, organic-inorganic hybrids such as silicones or combinations thereof; and
  (iv) organic-based toughening and/or plasticizing agents which can be in the form of resins, low molecular weight and/or high molecular weight polymers.

Processing aids such as mineral oils, vegetable oils, animal oils, silicone oils, fatty acids and salts, aliphatic alcohols, fluorinated oils, waxes, polyolefins (such as for example, but not limited to, polyethylene, oxidized polyethylene, and polytetrafluoroethylene), graphites, surfactants and mixtures thereof may also be added if needed.

An alternate expression of the chemical composition of the invention incorporating a reactive glass can be also described as follows:

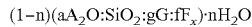

$$(1-n)(aA_2O:SiO_2:gG:fF_x)\cdot nH_2O$$

where:

A=(1−z) $K_2O$ or (z) $Na_2O$, where z can vary between 0 and 1, $K_2O$=potassium oxide, $Na_2O$=sodium oxide, $Li_2O$ and/or an equivalent such as LiOH can also be incorporated, if desired, $SiO_2$=silica, derived from a silica source such as Kasil-1, silica fume, silica, quartz or silica gel, or a combinations thereof, G=a reactive glass such as an alkaliborophosphate or an alkaliphosphoborate glass, $F_x$=optional additives and/or nonsilicate network former(s), such as one or more, alone or in combination, of the following:
  (i) $P_2O_5$, $B_2O_3$, or $SO_3$, derived from acidic precursors such as $H_3PO_4$, $H_3BO_3$ or $H_2SO_4$, or combinations thereof,
  (ii) network modifier(s) such as $Mg^{2+}$, $Zn^{2+}$, $Al^{3+}$, $Ti^{4+}$ derived from multivalent main group metal and/or transition metal compounds such as $Mg(NO_3)_2$, $ZnCl_2$, or a combination thereof,
  (iii) reactive and/or nonreactive fillers such as kaolin, smectites, hormites, mica, vermiculite, metakaolin, metal oxides, or a combination thereof,
  (iv) gelation modifiers such as an organic base (quinoline) and/or an organic acid (lactic acid),
  (v) surface-active agents such as an anionic, cationic and/or nonionic surfactant such as but not limited to alkylaryl sulfonates, quaternary ammonium salts, protonated organoamine salts, organic-inorganic hybrids such as silicones or combinations thereof,
  (vi) organic-based toughening and/or plasticizing agents which can be in the form of resins, low molecular weight and/or high molecular weight polymers.

$H_2O$=water, a=molar ratio of $A_2O:SiO_2$, which ranges from 0.05 to 1.00, g=molar ratio of $G:SiO_2$, which ranges from 0.01 to 0.500, f=molar ratio of $F:SiO_2$, which ranges from 0.000 to 2.000, x=0 to about 20 and represents the number of additives (F) used to aid in processing and performance of the basic formulation, and n=molar ratio of $H_2O$ incorporated into the formulation, where during initial formulation, the range is from 0.10 to 0.90, with n=0.15 to 0.35 being the preferred embodiment, and after cure, n is less than 0.25, with n <0.05 being preferred.

Processing aids such as mineral oils, vegetable oils, animal oils, silicone oils, fatty acids and salts, aliphatic alcohols, fluorinated oils, waxes, polyolefins (such as for example but not limited to polyethylene, oxidized polyethylene, and polytetrafluoroethylene), graphites, surfactants or combinations thereof may also be added, if needed.

The alkali silicates utilized in this invention can include a wide range of silica/alkali oxide ($SiO_2/A_2O$) ratios and % solids levels. Such solutions can be purchased from commercial sources or prepared immediately prior to use from precursors such as a silica source and an alkali hydroxide, alkali oxide, carbonate or combination thereof. The alkali silicate can be derived from an alkali base, such as potassium hydroxide or sodium hydroxide, from potash or soda ash and a silica source. The $SiO_2$ source can be an amorphous or crystalline $SiO_2$, such as silica, silica fume, precipitated silica, fumed silica, microsilica, sand, microcrystaline silica, silica gels, colloidal silica, quartz, quartz flour, a sodium silicate solution, a potassium silicate solution as well as solid sodium and/or potassium silicates. An example of a commercially available alkali silicate is Kasil-1, available from PQ Corporation, Valley Forge, Pa. Various silica sources exhibit desired as well as undesired attributes. For example, some silica fume sources contain traces of carbon that can lead to discoloration in the final product. In addition, the thermal and physical properties of the inorganic polymer matrix composition can be influenced by the nature of the silica source, for example, the incorporation of a dense crystalline α-quartz network can enhance dimensional stability while, in turn, introducing an open, amorphous silica source will produce a lower density network. However, an appropriate alkali silicate solution can be achieved by a combination of various sources of alkali and/or silica. When the alkali silicate is derived from an alkali hydroxide and a silica source, the alkali hydroxide is present in an amount of about 3 wt. % to about 30 wt. % based upon the weight of the total composition or mixture, preferably about 7 wt. % to about 20 wt. %. The silica source is present in an amount of about 10 wt. % to about 90 wt. %, preferably 15 wt. % to 70 wt. %. In some cases, for example, when an alkali silicate solution is used, a portion of the alkali hydroxide, silica and water provided is included in the ranges disclosed.

Secondary non-silicate network formers can be introduced if desired in the range of about 2 wt. % to 70 wt. %. A non-silicate network former can be added as an acidic oxoanionic compound. Examples of acidic oxoanionic compounds include boric acid, phosphoric acid, sulfuric acid, sodium dihydrogen phosphate, disodium hydrogen phosphate, dipotassium hydrogen phosphate, potassium dihydrogen phosphate, ammonium hydrogen phosphate, metallic and/or nonmetallic phosphate salts or compounds incorporating borate, sulfate, aluminate, vanadate, germanate, and the like ions and combinations or mixtures thereof. The preferred mixture of acidic oxoanionic compounds include mixtures of potassium dihydrogen phosphate and boric acid; sodium dihydrogen phosphate and boric acid; potassium dihydrogen phosphate, sodium dihydrogen phosphate and boric acid; sodium borate and potassium dihydrogen phosphate, which can be used in any grade or concentration although a more concentrated material is preferred to minimize the water content. The acidic oxoanionic compound is present in an amount of between about 0.01 wt. % and 20 wt. % based upon the total composition. The preferred amount of acidic oxoanionic compound is between about 2 wt. % to about 8 wt. %. Compounds which incorporate multivalent atoms and acidic oxoanions can also be incorporated. Examples include monoaluminum phosphate ($Al(H_2PO_4)_3$, aluminum metaphosphate ($Al(PO_3)_3$, monobasic magnesium phosphate, magnesium hydrogen phosphate, zinc dihydrogen phosphate, monocalcium phosphate, calcium hydrogen phosphate, monobasic barium phosphate, dibasic barium phosphate, manganese dihydrogen phosphate, manganese hydrogen phosphate and similar metal phosphates.

Alternatively, a non-acidic oxoanionic compound can be used as a network former. Examples of such compounds include trisodium phosphate, potassium phosphate, sodium borate or similar salts of acids, if the pH of the mixture is adjusted by other means. It is believed that the non-acidic oxoanionic compounds can be added in an amount similar to acidic oxoanionic compounds.

Alternatively, a reactive glass can be used in conjunction with the alkali silicate solution to form the composition. The phrase "reactive glass" encompasses a wide variety of acidic inorganic glasses that can contribute an acid group in the condensation reaction between the alkali silicate and the glass that occurs during the curing step. Reactive acidic glasses are preferred, and examples of reactive acidic glasses include borophosphosilicate, phosphate, phosphoborate, borophosphate and borate glasses. There may be reactive glasses which are not truly acidic, but which function in the same manner. A non-acidic glass (pH about 7 to about 10) can be used provided the pH of the reactive glass is less than that of the pH of the alkali silicate component and/or its precursors. Elevated processing conditions may be necessary to consolidate such a composition including higher temperatures (>200° C.) and/or higher pressures (>200 psi). Reactive glasses are different from essentially nonreactive structural glasses as used in beakers and drinking vessels, and optical glasses as used in windows. Reactive glasses are made according to typical glassmaking processes by combining oxide reactants. In the case of an alkali borophosphate glass, $P_2O_5$, $B_2O_3$, and one or more alkali oxides or their precursors are combined in a powder form and heating the mixture to its fusion temperature of about 700° C. to about 1500° C. and then rapidly cooling the melt and optionally annealing the glass to a rigid, friable state. The ratio of phosphoric oxide to alkali metal oxide ($A_2O$) will be about 6.1:1.0 to 1.5:1.0. In the case of an alkali phosphoborate glass, $B_2O_3$, $P_2O_5$ and one or more alkali oxides or their precursors are combined in a powder form and heating the mixture to its fusion temperature of about 700° C. to about 1500° C. and then rapidly cooling the melt and optionally annealing the glass to a rigid, friable state. The ratio of phosphoric oxide to alkali metal oxide ($A_2O$) will be about 5.0:1.0 to 1.15:1.0.and the ratio of boric oxide to alkali metal oxide ($A_2O$) will be about 8.0:1.0 to 1.5:1.0

Preferably, the glass solid is pulverized to form a powder. Reactive borophosphate glass powder is the preferred powder. The use of this preferred glass powder facilitates control of the cure rate and the amorphous nature of the matrix. The thermal and physical properties of the inorganic silicate/glass matrix can be varied by adjusting the ratio of $SiO_2$ to the reactive glass and/or glass precursors (B). The $B:SiO_2$ ratio can vary from 0.01 to 50.0 by weight. The reactive glass is used in an amount of between about 0.01% to 60% by weight of the total mixture, with 3% to 35% being preferred, and 5% to 20% by weight being the most preferred.

Since it is desired that the glass formed is acidic, the composition of the glass will consist primarily of the glass formers such as the oxides of phosphorus, boron and optionally, silicon. The preferred alkali oxide is lithium oxide. If a high phosphorus glass is needed, the glass composition before fusion will comprise about 20 mol % to about 80 mol % of phosphorus pentoxide ($P_2O_5$), or its salts, acids, or other precursor forms, which provide the right or equivalent amounts of phosphorous and oxygen based upon the total glass formulation, preferably 30 mol % to 70 mol %, with 35 mol % to 65 mol % being further preferred. Most preferably, 60–65 mol % is used. The boron oxide ($B_2O_3$) will comprise about 1 mol % to 15 mol % of the glass, with 2 mol % to 8 mol % being preferred and 4 mol % to 6 mol % further preferred. The alkali oxide ($A_2O$) comprises about 5 mol % to 50 mol % of the glass composition, with 20 mol % to 40 mol % being preferred, and 15 mol % to 30 mol % further preferred. The alkaline earth oxide (M'O) is used in an amount of between about 0.01 mol % to 30 mol % of the total glass mixture, with 5 mol % to 20 mol % being preferred, and 10 mol % to 15 mol % being further preferred Other oxides can be incorporated as desired, such as including but to limited to aluminum oxide, iron oxide, lanthanum oxide, cerium oxide, molybdenum oxide and silicon dioxide. These oxides are added at up to 20 mol %.

If a high boron glass is needed, the glass composition before fusion will comprise about 10 mol % to about 50 mol % of phosphorus pentoxide ($P_2O_5$), or its salts, acids, or other precursor forms, which provide an equivalent amounts of phosphorus and oxygen based upon the total glass formulation, preferably 20 mol % to 40 mol %, with 25 mol % to 35 mol % being further preferred. The boron oxide ($B_2O_3$) will comprise about 10 mol % to 70 mol % of the glass, with 30 mol % to 60 mol % being preferred and 45 mol % to 55 mol % further preferred. The alkali oxide ($A_2O$) comprises about 5 mol % to 45 mol % of the glass composition, with 20 mol % to 40 mol % being preferred, and 15 mol % to 30 mol % further preferred. The alkaline earth oxide (M'O) is used optionally in an amount of between about 0 mol % to 30 mol % of the total glass mixture, with 5 mol % to 20 mol % being preferred, and 10 mol % to 15 mol % being further preferred if used.

The formulation of the reactive glass is critical to the chemistry and the performance of this invention. It is desired that the glass react with the alkali silicate mixture to reduce the basicity of the resulting matrix and to conjoin multiple networks. The combination of very different networks, one silicate-based and the other phosphate-based results in a blend of an amorphous inorganic polymer and a crystalline network as well as new network units formed by reaction of the basic silicate and the acidic phosphate such as —Si—O—P—. Both silicate and phosphate species are known to be excellent network formers form the basis for this invention.

The reactive glass that can be used to form the composite can be concisely described by the following formula:

$$\prod_{k=1}^{n}((M^{p+})_{q'})(E^{q-})_{p'})\quad \text{where} \sum_{r_k} r_k = 1$$

where:

n=number of desired glass components,

M=at least one glass former, such as boron, silicon, phosphorus, sulfur, germanium, arsenic, antimony, aluminum, and vanadium, and at least one glass modifier which functions as a flux, such as lithium, sodium, potassium, rubidium and cesium, and, optionally, additional network modifiers such as vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, and cadmium, E=oxygen, chalcogenides and/or halogens such as sulfur, selenium, tellurium and fluorine, p=cation valence of M, such as 5 for phosphorus, which is generally portrayed as $P^{5+}$ or P(V)), q=anion valence of E such as 2 for oxygen, which is generally portrayed as $O^{2-}$, q'=number of M cations contained in a network unit equal to q or q/2 whichever is the lesser whole number whenever p and q are even numbers, such as 2 for phosphorus in $P_2O_5$ or 1 for silicon in $SiO_2$, p'=number of E anions contained in a network unit equal to p or p/2 whichever is the lesser whole number whenever p and q are even numbers, such as 5 for phosphorus in $P_2O_5$ or 2 for silicon in $SiO_2$, r=molar fraction of each individual network unit in the reactive glass component, n=number of total network units in the reactive glass component.

A binary glass can be represented by $\{(M_1^{p+})_{q'})(E_1^{q-})_{p'}\}_{r1}\{(M_2^{p+})_{q'})(E_2^{q-})_{p'}\}_{r2}$, $r_1+r_2=1$ and a ternary glass can be generalized as $\{(M_1^{p+})_{q'})(E_1^{q-})_{p'}\}_{r1}\{(M_2^{p+})_{q'})(E_2^{q-})_{p'}\}_{r2}\{(M_3^{p+})_{q'})(E_3^{q-})_{p'}\}_{r3}$, $r_1+r_2+r_3=1$. Thus a soda-lime glass can be described as $(CaO)_{r1}(SiO_2)_{r2}(Na_2O)_{r3}$ where $r_1+r_2+r_3=1$. Silicon (Si) is a glass former covalently bound to oxygen to yield the glass network and sodium (Na) and calcium (Ca) are glass modifiers that bond ionically to the silicate network aiding in the formation and durability of the glassy phase. Therefore, M generically represents at least one glass network former ($M_{gf}$) and at least one glass network modifier ($M_{gm}$) in the glass recipe.

Thus, for a three-component reactive acidic glass containing phosphorus, magnesium, and an alkali metal (A'), the generalized formula is:

$$(A'_2O)_x(P_2O_5)_y(MgO)_z$$

where A' represents a fluxing agent, such as lithium, sodium, potassium, rubidium and cesium, x is between about 0.050 and 0.500, y is between about 0.200 and 0.900, z is between about 0.010 and 0.150, x+y+z=1 and x<y.

Additional glass modifiers can be added as additional fluxing agents and/or stabilizing modifiers to enhance physical and/or chemical durability of the composition and to resist water and/or devitrification.

For a four component reactive acidic glass containing glass formers, phosphorus and boron, a glass network modifier (A") and an alkali metal flux (A'), the generalized formula is:

$$(A'_2O)_x(P_2O_5)_{y1}(B_2O_3)_{y2}(A''O)_z$$

where A' is an alkali metal fluxing agent, A"O is a metallic glass modifiers, x ranges from about 0.050–0.500, $y_1$ ranges from about 0.030–0.800, $y_2$ ranges from about 0.010–0.700, z is between about 0.010 and 0.300, $x+y_1+y_2+z=1$ and $x<y_1$.

So, if A"=Mg, then the formula would be:

$$(A''_2O)_x(P_2O_5)_{y1}(B_2O_3)_{y2}(MgO)_z$$

where A' is an alkali metal fluxing agent, x ranges from about 0.050–0.500, $y_1$ ranges from about 0.030–0.800, $y_2$ ranges from about 0.010–0.700, z is between about 0.010 and 0.300, $x+y_1+y_2+z=1$ and $x<y_1+y_2$.

For a five-component reactive acidic glass component containing glass formers ($M_{gf}$), phosphorus and boron; glass network modifiers (A"), magnesium and barium, and an alkali metal flux (A'), the generalized formula becomes:

$$(A'_2O)_x(P_2O_5)_{y1}(B_2O_3)_{y2}(MgO)_{z1}(BaO)_{z2}$$

where A' is an alkali metal fluxing agent, x ranges from about 0.050–0.500, $y_1$ ranges from about 0.030–0.800, $y_2$ ranges from about 0.010–0.700, $z_1$ ranges from about 0.010–0.200, and $z_2$ ranges from about 0.010–0.200, $x+y_1+y_2+z_1+z_2=1$ and $x<y_1+y_2$. For a five-component reactive acidic glass component containing glass formers ($M_{gf}$), phosphorus and boron; glass network modifiers (A"), magnesium and barium, and an alkali metal flux (A') such as lithium oxide, the formula becomes:

$$(Li_2O)_x(P_2O_5)_{y1}(B_2O_3)_{y2}(MgO)_{z1}(BaO)_{z2}$$

where x ranges from about 0.050–0.500, $y_1$ ranges from about 0.030–0.800, $y_2$ ranges from about 0.010–0.700, $z_1$ ranges from about 0.010–0.200, and $z_2$ ranges from about 0.010–0.200, $x+y_1+y_2+z_1+z_2=1$ and $x<y_1+y_2$.

For a five-component reactive glass component containing phosphorus, boron, aluminum, potassium and sodium, the generalized formula is:

$$(Na_2O)_{x1}(K_2O)_{x2}(P_2O_5)_{y1}(B_2O_3)_{y2}(Al_2O_3)_{z1}$$

where the alkali metal fluxing agent is represented by Na and K where $x_1+x_2$ ranges from about 0.050–0.500, $y_1$ ranges from about 0.030–0.800, $y_2$ ranges from about 0.010–0.700 and $z_1$ ranges from about 0.010–0.200, $x_1+x_2+y_1+y_2+z_1=1$ and $x_1+x_2<y_1+y_2$.

For a six-component reactive acidic glass component containing glass formers ($M_{gf}$), phosphorus and boron; glass network modifiers (A"), magnesium, barium and aluminum, and an alkali metal flux (A'), the generalized formula becomes:

$$(A'_2O)_x(P_2O_5)_{y_1}(B_2O_3)_{y_2}(MgO)_{z_1}(BaO)_{z_2}(Al_2O_3)_{z_3}$$

where A' is an alkali metal fluxing agent, x ranges from about 0.050–0.500, $y_1$ ranges from about 0.030–0.800, $y_2$ ranges from about 0.010–0.700, $z_1$ ranges from about 0.010–0.200, and $z_2$ ranges from about 0.010–0.200, $x+y_1+y_2+z_1+z_2+z_3=1$ and $x<y_1+y_2$.

For a six-component (exclusive of oxygen) reactive glass component containing phosphorus, boron, silicon, aluminum, potassium and sodium, the generalized formula is:

$$(Na_2O)_{x_1}(K_2O)_{x_2}(P_2O_5)_{y_1}(B_2O_3)_{y_2}(SiO_2)_{y_3}(Al_2O_3)_{z_1}$$

where the alkali metal fluxing agent is represented by Na and K where $x_1+x_2$ ranges from about 0.050–0.500, $y_1$ ranges from about 0.030–0.800, $y_2$ ranges from about 0.010–0.700, $y_3$ ranges from about 0.010–0.200 and $z_1$ ranges from about 0.010–0.200, $x_1+x_2+y_1+y_2+y_3+z_1=1$ and $x_1+x_2<y_1+y_2$.

Of course, the various glass formulations can be made by substituting different glass formers, such as boron, silicon, phosphorus, sulfur, germanium, arsenic, antimony, aluminum, and vanadium, as well as different fluxing agents and glass network modifiers. Varying the compositions results in different glass formulations than the borophosphate glasses used as examples.

The chemical and physical properties of the phosphate glass are determined by the initial formulation, the composition of the individual glass components, refining, annealing and aging conditions. The properties of the glass desired for this invention include an acidic formulation, durability, hydrolytic stability, reactivity and plasticity. The type and ratio of the glass components dictate these properties. For instance, a very reactive yet durable glass can be prepared using $NH_4H_2PO_4$, $Li_2CO_3$, $B(OH)_3$ and $MgCO_3$. The molar ratio of $[P_2O_5]:[Li_2O]$ must be greater than 1 to yield an acidic formulation. The addition of $B_2O_3$ (from $B(OH)_3$) enhances the durability of the phosphate glass while the selection of $Li_2O$ (from $Li_2CO_3$) and MgO (from $MgCO_3$) reduce water sensitivity.

An alternate glass can be prepared from metal phosphates such as sodium dihydrogen phosphate, potassium dihydrogen phosphate, aluminum metaphosphate, monoaluminum phosphate and boric acid. In this case the glass is acidic when the molar ratio of $([P_2O_5]+[B_2O_3]):([K_2O]+[Na_2O])$ is greater than 1 but soluble in water. In part, the variations of the molar ratios of all the components govern acidity, durability, hydrolytic stability, the glass softening temperature ($T_s$), the glass melting temperature ($T_m$) and the glass transition temperature ($T_g$) of the glass. The refining time and temperature of the glass also influences its physical and mechanical characteristics. For a constant composition increasing the refining temperature and/or time further densifies the glass network raising the $T_g$, $T_s$ and $T_m$, reducing network activity and the hydroxyl/$H_2O$ content of the glass while enhancing durability. Thus by varying the glass composition, the glass refining time and temperature, various glass formulations can differ greatly with regard to reactivity, durability, acidity, hydrolytic stability, toughness and processing. Modest levels of silica and/or alumina may be optionally added to limit furnace contamination and/or strengthen the glass network if needed for very high temperature resistance (>900° C.). The matching, blending and adjustment of the glass and the alkali silicate properties allows the formulation of a high-temperature material with unique and novel properties. In other words, the ability to vary these "building blocks" enables one to tailor product properties to suit numerous high-temperature applications.

The particle size of the reactive glass, as is the particle size of the additional ingredients, is important, but not critical. Obviously, reactivity of the ingredients increase as the particle size decreases and if the particles are too fine, then the materials may be too reactive, thus adjustments may be needed to be made in the components employed to make the compositions of the present invention. The powder components of the composition (silica, reactive glass, etc.) can be prilled, granulated, pelletized or otherwise compacted prior to addition to the liquid portion of the composition.

Although the invention is the inorganic polymer matrix composition resulting from the reaction of the alkali silica source and the a non-silicate network former and/or reactive glass, the mechanical, the physical and processing characteristics of the matrix can be enhanced by the additional components as desired. Additional components such as, additives, fillers, other network forming materials and modifiers can be incorporated, as needed. These include additives, network formers, and fillers typically used or known to ones skilled in the art, whether inorganic, organic or hybrid, and can include additives or fillers to permit processing, fabrication and enhanced performance in service.

The optional additives and/or additional network former(s) can be compounds such as borates, sulfates, aluminates, vanadates, boric acid, phosphoric acid, sulfuric acid, nitric acid, phosphorus pentoxide, sodium dihydrogen phosphate, disodium hydrogen phosphate, potassium hydrogen phosphate, dipotassium hydrogen phosphate, ammonium hydrogen phosphate, other metallic and/or nonmetallic phosphate salts, germanates, or the like. The optional network former(s) are present in an amount of between 0.0 wt. % and 50 wt. % based upon the total composition. If included in the formulation, the preferred amount of the $F_1$ network former would be between 2 wt. % to about 10 wt. %.

The secondary network modifier can be multivalent cations which are used will be selected from Groups 2, 3, 4, 5, 6, 7, 8, 9, 10, 11, 12, 13, 14, 15 and 16, preferably from Groups 2, 3, 4, 5, 11, 12, 13, 14, 15 and 16 of the Periodic Table and are used in an amount of between zero and about 20 wt. % based upon the total mixture, with the ranges of about 1.0 wt. % to about 5 wt. % is preferred. Multivalent cations Cr, Mo, W, Mn, Fe, Co, Ni, Pd, and Pt of the Groups 6, 7, 8, 9, and 10, also can be used, but ones from the other Groups are preferred. The multivalent cation containing compounds can comprise any main group metal salt including nitrates, sulfates and chlorides, although salts of zinc, magnesium and calcium are preferred. The optional secondary network modifier can be a multivalent cation useful for coordinating with oxo species such as the alkaline earths, main group metals, transition metal species, lanthanides and/or actinides and any useful combination thereof. Other secondary network modifiers can include compounds incorporating boron, aluminum, lead, gallium, cadmium, titanium, zirconium, lanthanum, cerium, neodymium, yttrium, strontium, barium, lithium, rubidium, cesium, and fluorine.

The optional additives that can be used include clay fillers, oxide fillers, gel modifiers, organic toughening agents, plasticizing agents or combinations thereof. Fillers include kaolin, metakaolin, montmorillonites, mica as well as other smectites and other clay or mineral fillers. When clay fillers are employed, calcined kaolin is preferred, and can be used in an amount from zero to 25 wt. % based upon the weight of the total composition, with 3 wt. % to 5 wt. % being preferred. The calcined kaolin may have some reactivity with the silicate matrix material, although reactivity of the clay filler is not required, and any of the commercially available clay fillers can be employed.

The optional oxide fillers that could be employed include zinc oxide, calcium oxide or magnesium oxide (MgO, which is preferred) or combinations thereof. The optional oxide filler is used in an amount of zero % to 15% by weight based upon the total weight of the composition, with 1% to 10% by weight being preferred and 2% to 8% by weight being further preferred.

Modifiers can include crosslinkers and gel inhibitors or promoters such as mineral acids, organic acids and bases. Crosslinkers can also be introduced as metal phosphates as described earlier. These include aluminum phosphate, magnesium phosphate, calcium phosphate, zinc phosphate, iron phosphate, cerium phosphate, lanthanum phosphate, barium phosphate, monoaluminum phosphate ($Al(H_2PO_4)_3$), aluminum metaphosphate ($Al(PO_3)_3$), monobasic magnesium phosphate, magnesium hydrogen phosphate, zinc dihydrogen phosphate, monocalcium phosphate, calcium hydrogen phosphate, monobasic barium phosphate, dibasic barium phosphate, manganese dihydrogen phosphate, manganese hydrogen phosphate and similar metal phosphates.

The optional gel modifier is an organic acid and/or organic base generally selected from the group consisting of hydroxyacids, N-based and P-based bases or combinations thereof. Examples of organic acids include lactic acid and citric acid. Preferably α-hydroxyacids, β-hydroxyacids, substituted pyridines and quinolines are used. These are utilized in an amount from none to 10 wt. % based upon the weight of the total composition, with 0.05 wt. % to 5 wt. % being preferred. The optional surface-active agent is an anionic, cationic and/or a nonionic surfactant such as but not limited to alkylaryl sulfonates, silicones, quaternary ammonium salts, protonated organoamine salts, hydroxyl polymers, organic-inorganic hybrids such as silicones or combinations thereof. These additives are utilized in an amount from none to 10 wt. % based upon the weight of the total composition, with 0.5 wt. % to 5 wt. % being preferred.

The optional organic toughening agent and/or plasticizing agent is an organic-based toughening agent, plasticizing agent, or combinations thereof. The organic based toughening agents can be chosen from the group consisting of resins, low molecular weight and/or high molecular weight polymers. These are utilized in an amount from none to 10 wt. % based upon the weight of the total composition.

The balance of the uncured composition is water and it will comprise about 10 wt. % to about 75 wt. % based upon the total composition weight. The range of 15 wt. % to 40 wt. % is preferred. The water can be introduced as part of one of the components, such as part of an alkali silicate solution, an alkaline earth salt solution or part of a phosphoric acid solution. Since the water incorporated in this invention can be viewed as a reaction medium, a reactant as well as a reaction product, the concentration of water can be difficult to quantify in general. The initial level of water in the starting mixture can vary from about 10 wt. % to about 70 wt. % while a B-staged prepreg may contain about 5 wt. % to about 35 wt. % water. A cured sample of the inorganic binder by itself as well as the composite can contain about 0 wt. % to about 10 wt. % water depending upon the processing conditions.

The reinforcing medium combined with the inorganic polymer compositions of the present invention can be a material composed of continuous and/or discontinuous fibers, which will be encapsulated in the matrix material. Reinforcement can range from about 2 vol % to about 60 vol %. Reinforcing fibers may include nickel fibers, glass fibers, carbon fibers, graphite fibers, mineral fibers, oxidized carbon fibers, oxidized graphite fibers, steel fibers, metallic fibers, metal-coated carbon fibers, metal-coated glass fibers, metal-coated graphite fibers, metal-coated ceramic fibers, nickel-coated graphite fibers, nickel-coated carbon fibers, nickel-coated glass fibers, quartz fibers, ceramic fibers, silicon carbide fibers, stainless steel fibers, titanium fibers, nickel alloy fibers, brass-coated steel fibers, polymeric fibers, aramid fibers, basalt fibers, alkaline resistant glass fibers and/or other fibers known to those knowledgeable in the arts. Combinations of these various fibers can also be used. These fibers can also be coated and/or treated. Examples of suitable coatings to be used on the fibers, include but are not limited to, vapor deposited metal and metal alloys, chemically deposited metal and metal alloys, metals and metal alloys applied in a molten state, electrolytically applied metals and metal alloys, organic polymer coatings, inorganic-organic polymer hybrid coatings, metal oxides, phosphates, metal phosphates, silicates, organic polymer-silicate and organic polymer-silica hybrids and functionalized siloxanes.

Reinforcing fibers may be in many forms, including yarns, tows, whiskers, continuous fibers, short fibers, woven fabrics, knitted fabrics, non-woven fabrics, random mats, felts, braided fabrics, wound tows, wire and/or other forms known to those knowledgeable in the arts.

Glass fiber reinforcement (including for example but not limited to E-glass fibers, S-glass fibers, or alkali resistant glass fibers) can be used as a reinforcing material. Composite structures can also incorporate hybrid fiber reinforcements such as combinations of glass, carbon, organic polymer, oxide and/or metal fibers. The reinforcement can be in the form of woven or non-woven fabric, mesh, screen, wool, continuous or non-continuous fibers. The different fibers and/or fabrics can be commingled throughout the matrix or discretely separated into layers. Examples include alternating layers of carbon and glass fiber reinforcement as well as steel screen sandwiched between glass veils. The composite materials using glass fiber reinforcement and the matrix binder of the present invention are affordable, non-combustible, thermally-stable [for example, no measurable (<0.2%) permanent dimensional change after 48 hours of exposure at 700° C.] composite materials with insulating qualities and structural qualities that can be processed at lower temperatures using typical processing equipment. Normal processing can be at relatively low temperatures (<200° C.) and low pressure (<200 psi). A cross-ply glass fiber laminate can be produced with thermal insulating qualities (for example, thermal conductivity of nominally 1.4 W/m-K), electrical insulating qualities (no detectable electrical conductivity when measured with a standard ohm meter) and modest mechanical performance (flexural modulus up to 18 Msi, flexural strength to 200+ ksi, and ultimate flexural strains up to 1.3%). This combination of properties should be enabling technology for many applications.

Ceramic fiber reinforcement (including silicon carbide fibers) is another preferred reinforcement, especially for high temperature applications above 700° C. Although expensive, ceramic fibers maintain structural integrity well above 1000° C. Carbon fiber reinforcement is a preferred reinforcement where electrical conductivity, thermal conductivity, high strength and/or impact resistance is desired.

The mechanical properties of a composite structure incorporating the inorganic polymer matrix composition can be enhanced provided there is sufficient interaction between the matrix and the reinforcement. A composite structure incorporating the inorganic polymer matrix composition provides an enhanced level of mechanical strength if the reinforcement exhibits some degree of oxophilic character at the matrix-reinforcement interface. A composite structure comprising the inorganic polymer matrix composition and stainless steel reinforcement exhibits an enhanced level of mechanical performance. The improvement is better illustrated when using a carbon or graphite fiber as reinforcement. Carbon and/or graphite fibers are inherently nonpolar and hydrophobic but can be treated in a variety of ways to develop regions of hydrophilic character such as the application of sizing or other coatings (generally organic polymers such as epoxies or organosilanes) or through the use of surfactants. Generally enhancing the hydrophilic nature of fiber will also create a more oxophilic surface and improve the interface between the reinforcement and the matrix but the reinforcement can be made more oxophilic by other means. Metallization of the fiber can develop an oxophilic surface that will significantly enhance the interfacial strength of the composite structure. Chemical, thermal and electrolytic oxidation of carbon, graphite and/or polymeric reinforcements can also enhance oxophilicity and thus the interfacial strength and mechanical properties of the composite structure. Furthermore, the fiber can be sized with an organic polymer combined with an inorganic oxide particulate such as a glass frit, reactive glass frit, silica, alumina, zirconia and similar oxide-based materials. This imparts an oxophilic character to the surface of the reinforcement. These concepts can extend also to other oxo-based matrix compositions including but not limited to alkali silicate resins, metal phosphate resins, cementitious materials, refractory compounds and other oxide-based inorganic and/or inorganic/organic hybrid materials. Ensuring that the surface of the reinforcement media has sufficient irregularity and/or roughness to promote a beneficial mechanical interaction can also enhance the interface between the matrix and the reinforcement.

In addition, the inorganic polymer matrix compositions may incorporate a wide variety of organic and inorganic fillers commonly used by those knowledgeable in the art. The matrix may incorporate filler materials such as ceramic powders, mineral powders, metallic powders, silicon carbides, silicon nitrides, silicates, boron nitrides, aluminosilicates, aluminum silicates, sodium aluminum silicates, potassium aluminum silicates, carbon, carbon black, carbon nanotubes, molybdenum and its compounds, or other fillers known to those knowledgeable in the arts. Organic materials are less preferred where the application is such that the organic materials will combust and produce gases. The filler materials also could be spheres such as microspheres, macrospheres, hollow and/or solid spheres, and/or cylindrical, flat and/or irregular or nonirregular shaped particles.

The inorganic polymer matrix composition of the present invention influences the pH of the solution containing the alkali silicate backbone by incorporating an acidic inorganic component (such as a protonated oxoanions such as phosphoric or boric acid, dihydrogen phosphate or reactive glasses) and acidic salt modifier such as an alkaline earth salt. The alkali silicate solutions require a high pH to maintain a high concentration of monomeric silicate anions needed to moderate network formation. The ability to cure under moderate conditions after reducing the pH to a lesser value reduces the damage to the glass fiber reinforcement induced by the alkalinity of the matrix. The inorganic matrix binder cures via a condensation reaction partially driven by the elimination of water from the framework and excessive water in the binder leads to a lack of dimensional stability, poor physical properties and difficulty in processing.

As can be appreciated, the inorganic polymer matrix compositions of the present invention can be fabricated and processed into composites using compression molding, bulk molding compound, sheet molding compound, powder and reinforcement, liquid and reinforcement, prepreg and sintering. Additional methods include pultrusion (an automated process capable of producing a constant cross-section product), wet lay-up (a simple manual process for rapid prototypes and affordable low performance products), filament winding (an automated process for bodies of revolution), vacuum bag processing (a typical process for high performance aerospace laminates), autoclave or non-autoclave, vacuum infusion (a process for large thick high-performance parts), liquid resin, film infusion or powder infusion, resin transfer molding (a near net-shape molding process with excellent dimensional repeatability), extrusion (a process capable of producing constant cross-section non-structural short-fiber products), injection molding (an automated process capable of producing small non-structural short-fiber products), casting (a process for bulk non-structural products), spin casting (a process capable of producing high-quality tubing), trapped elastomer molding (a process capable of producing unusual shapes), and like processes.

The composite is cured within a temperature range of about 15° C. to about 1000° C. and higher, and a pressure range from 0 psi to about 2000 psi, preferably at a temperature between about 50° C. to about 200° C. and at a pressure less than about 200 psi.

If desired, the composite part can be thermally post-cured and/or chemically treated to further enhance thermal, dimensional or hydrolytic stability or combinations thereof. The part can be thermally treated in air, in vacuo or in an inert atmosphere within a temperature range of about 15° C. to about 1000° C. The composite part can be washed with water or other solvent to remove excess reactants. Furthermore, this can be done after only partial formation of the inorganic polymer network prior to completion of the curing process. The composite part can also be contacted with acid solutions, metal salt solutions, metal acid salt solutions, surfactant solutions, solutions of fluorinated compounds, silicon-based compounds, organic prepolymers, ionomers, polymers and/or other solutions intended to impart hydrophobicity.

For example, immersion or coating of a composite structure with a dilute solution of phosphoric acid can enhance both the thermal as well as the hydrolytic stability of the composite structure. The phosphoric acid may be in solution with one or more metallic salts. Similar improvement can be achieved using a dilute solution of a magnesium salt alone or in combination with the phosphoric acid solution. Other soluble polyvalent metallic salts such as those containing aluminum, calcium, zinc, cerium, lanthanum and/or similar salts can be used also. Solutions of monovalent metallic salts such as lithium hydroxide, lithium acetate, lithium chloride and so forth can also be contacted with the composite structure if desired.

These processes have several advantages compared to the curing/consolidation methods normally used in making high temperature inorganic polymers, namely ceramics and glasses. Ceramic and glass processing typically requires high temperature processing equipment (above 1000° C.). The nature of the inorganic matrix formulation of the present invention allows composites to be processed with conventional equipment found in composite manufacturing facilities. These processes allow a more rapid throughput than typical ceramic processes and enable the easy manufacturing of larger parts than typical ceramic processes. The use of these processes allows high fiber volumes for structural integrity, which is superior to regular concrete processing.

Alternatively, the inorganic polymer matrix composition of the present invention is not solely limited to composites. The composition can be used to form neat resin components, coatings and adhesives.

As can be appreciated, the present invention can be formulated to be non-combustible. This desirable safety feature differentiates the invention from most organic materials (such as for example but not limited to plastics, wood, or rubber) that tend to combust, generate smoke and/or toxic gases upon exposure to fire. Further, the present invention can be formulated to be a thermal insulator and/or an electrical insulator. This desirable feature differentiates compositions in accordance with the present invention from most metals (such as steel, aluminum, or copper) that tend to be thermal and electrical conductors.

The present invention can be formulated to perform at high temperatures (>1000° C.) with negligible permanent changes in dimensions. This desirable feature differentiates the invention from most organic materials (which tend to pyrolyze when exposed to temperatures above 500° C.), from most cement formulations (which tend to spall above 300° C.) and from many metals (including aluminum) that tend to warp or melt at 700° C. As a further feature, the present invention can achieve high temperature performance (up to and above 1000° C.) while being processed at relatively low temperatures, (<200° C.) and low pressures (for example but not limited to <200° C. and <200 psi). This feature is desirable because the ability to process at low temperatures and pressures allows the invention to be processed with more affordable equipment and manufacturing processes. This feature of the chemistry differentiates the present invention from most ceramics, glasses and metals, which generally require very high temperatures and/or high pressures to create a molded shape. (Of course, the invention also can be effectively processed at higher temperatures and pressures; the material has been processed at pressures above 10,000 psi and at temperatures above 1500° C.).

In some instances, an application may require a thermal barrier to resist a flame and/or elevated temperatures for a single service cycle and then replaced or applications at reduced service temperatures, which do not need to withstand extreme temperatures greater than 200° C. An organic-inorganic hybrid based on the present invention may be useful. The organic component may be monomeric, oligomeric or polymeric in nature and imparts additional toughness, plasticity and flexibility to the hybrid composition.

The present invention can be formulated to impregnate fibers to form a rigid composite material. This desirable feature differentiates the invention from most materials, because most rigid materials have not been processed as a low viscosity liquid capable of wetting fibers. Fiber reinforcement within a matrix material offer many benefits, including improved strength, stiffness, fracture toughness, fatigue, strength and impact resistance. While fiber-reinforced composite materials are common in applications ranging from automotive fascia to F-22 aircraft structures, the vast majority of composite materials are made with organic matrix materials, which are combustible. Non-combustible composite materials, such as ceramic matrix composite materials and metal matrix composite materials, tend to be cost prohibitive for most applications because of the high processing temperatures required. The present invention can be processed at much lower cost than most ceramic or metal matrix composite materials. These desirable features differentiate the present invention from many materials, including numerous metals.

The present invention readily can be formulated to incorporate a wide variety of fillers to tailor the material performance to suit the specific application. These fillers that may include hollow spheres, conductive fillers, friction and/or thermal additives, can be incorporated to modify physical properties including but not limited to density, conductivity, coefficient of friction, or thermal performance. These desirable features differentiate the present invention from many materials, including many metals. Given these features, the present invention is suited for many applications, including fire barriers, heat shields, high-temperature insulators, high-temperature molds, friction products, tooling and structures in high temperature environments.

Cellular materials, such as foamed compositions, can be formed from the present invention, which materials are nonflammable and useful for thermal management, fire protection and other high temperature applications. The capability of the present invention to withstand temperatures beyond 800° C. allows its use in applications that cannot be met by organic-based foamed materials and/or its derivatives. Inorganic cellular materials, such as foamed compositions, made from carbon, glass or ceramic materials can resist similar temperatures but are costly limiting their use for large scale thermal management needs and/or cost sensitive applications. Cellular materials prepared from the present invention can also be molded into complex as well as simple shapes as required and/or specifically shaped using traditional machining equipment. Cellular materials, such as foamed material can be either structural (integral) or non-structural, formed with or without the use of a foaming agent. A syntactic foamed material can also be prepared utilizing the present invention and the appropriate fillers such as microspheres, microballoons and/or microcapsules.

This technology may be applied to a wide variety of applications such as reinforced missile silos, ship decks, aircraft carrier blast and heat shields, fire barriers, hot gas filters, protective coatings, electrical panels and boxes (with and without EMI shielding), engine covers, or any application that would need, advantageously, protection from fire and heat transfer damage, corrosion resistance, lifecycle cost savings and weight reduction. Additionally, this technology can be applied to reinforced insulator inserts for aircraft brakes. The insulator within each piston thermally isolates the friction head from the hydraulic system. Compared to conventional resins, which decompose below 450° C., the matrix binders of the present invention have much higher thermal stability (to above 1000° C.), and in contrast to metals, the composite of the present invention has superior insulation performance. This protects the hydraulic system and can reduce the weight and/or associated costs. In comparison to ceramics, the composite of the present invention is tougher because due to the presence of the reinforcing fibers, but less expensive than ceramic matrix composites due to the materials and processes utilized.

The following material properties and standardized tests are used to evaluate the performance of composites prepared with the inorganic matrix polymers of the present invention: hydrolytic stability; flexural strength (ASTM D790-99), flexural modulus (ASTM D790-99), ultimate flexural strain (ASTM D790-99), specific gravity (ASTM D792), thermal dimensional stability, thermal conductivity (modified ASTM C177), electrical conductivity; pH (of the resin solution, the neat resin and the composite structure) Differential Scanning Calorimetry (DSC); combustibility, thermal conductivity (ASTM C177), electrical conductivity (ASTM D257), voltage breakdown (ASTM D229), permittivity at 1 MHz (ASTM D229), dissipation factor at 1 MHz (ASTM D229), arc resistance (ASTM D229), Izod impact strength (lengthwise & crosswise) (ASTM D229), flammability (UL 94, ASTM E1354), dielectric constant; temperature index (NEMA LI-6), tensile strength, modulus and ultimate strain (ASTM D638), compression strength, modulus and ultimate strain (ASTM D695), interlaminar shear strength (ASTM D3846), short beam shear strength (ASTM D2344) and compression after impact.

The following examples are illustrative of the present invention, and should not limit the scope of the invention.

GENERAL EXAMPLE

The following example will serve to illustrate a matrix binder in accordance with the present invention (Ingredients shown in Table 1):

The alkali base, potassium hydroxide (KOH, 280.00 g) is dissolved in a diluted potassium silicate solution (Kasil-1, 570.50 g combined with 122.50 g of water) with gentle stirring. An exotherm will occur and the mixture can be cooled as needed. If desired, a surfactant can be added (DBE-712, manufactured by Gelest Inc., Morrisville Pa., 3.50 g). Zinc chloride (15.75 g) is then added to potassium silicate solution. The silica fume (665.00 g) can be combined with the remaining ingredients or added separately at this point. The silica fume can be in pelletized or densified form is desired. The remaining ingredients, metakaolin (183.75 g) and potassium monobasic phosphate (92.75 g, $KH_2PO_4$) are then added if not previously combined with the silica fume. The mixture is allowed to mix for 0.5–1.0 hours and the viscosity approaches a level (approximately 150 centipoise) suitable for application to the reinforcement medium (fabric, chopped fiber, wound filament, etc.) needed to construct the composite. The resin mixture can be either used to prepare a prepreg at this point or transferred to a storage container and placed in cold storage (typically <0° C.) for future use. The composite material can be prepared using any of the composite molding methods typically employed, the test specimen for this example was formed into a composite by a traditional prepreg/lay-up method. A "prepreg" is formed by impregnating a reinforcing medium or reinforcement with the matrix binder to produce a binder coated fabric sheet. The next step is to layer the individual prepregs together to achieve the desired thickness and/or shape. Next, the "lay-up" is placed into a mold to compact or consolidate the prepregs and to form the composite shape. Optionally, the prepregs could be subjected to a B-staging period, vacuum bagging to reduce the water content and/or separation(s) intended to remove excess reactants, non-polymeric products, contaminants and/or other matter from the desired product.

Carbon fiber composite panels consisting of eight plies were made using the matrix binder of Example 1 and compression molded using standard composite processing parameters: curing at 220 psi and 80° C. for 4 hours, 110° C. for 4 hours and 150° C. for 4 hours. The mechanical strengths of the cured samples are shown in Table 1.

EXAMPLES 1–9

Modified alkali silicate compositions were made in accordance with the process set forth in the General Example, but the ingredients were varied as shown in Table 1. The resin compositions were placed in cold storage (<0° C.) for later use.

TABLE 1

MATRIX FORMULATIONS IN EXAMPLES 1–9

| Ingredients | Example 1 (g) | Example 2 (g) | Example 3 (g) | Example 4 (g) | Example 5 (g) | Example 6 (g) | Example 7 (g) | Example 8 (g) | Example 9 (g) |
|---|---|---|---|---|---|---|---|---|---|
| Kasil-1 | 570.50 | 570.50 | 570.50 | 425.00 | 570.50 | 570.50 | 570.50 | 570.50 | 570.50 |
| KOH | 280.00 | 262.50 | 262.50 | 200.00 | 262.50 | 262.50 | 262.50 | 262.50 | 262.50 |
| $H_2O$ | 122.50 | 144.38 | 157.50 | — | — | — | — | — | — |
| Gelest DBE-712 | 3.50 | 3.50 | 3.50 | 3.50 | — | 3.50 | — | 3.50 | 3.50 |
| Silica fume | 714.00 | 722.25 | 722.25 | 725.00 | 727.75 | 722.25 | 722.25 | 722.75 | 722.25 |
| $KH_2PO_4$ | 92.75 | 33.25 | 33.25 | 45.00 | 13.13 | 33.25 | 33.25 | 8.75 | 8.75 |
| $B(OH)_3$ | — | 38.50 | 38.50 | 50.00 | 38.50 | 38.50 | 38.50 | 38.50 | 38.50 |
| Metakaolin | 183.75 | 183.75 | 183.75 | 230.00 | 183.75 | 183.75 | 183.75 | 183.75 | 183.75 |
| $ZnCl_2$ | 15.75 | 15.75 | 15.75 | 12.00 | 15.75 | 15.75 | 15.75 | 15.75 | 15.75 |
| $Al(OH)_3$ | — | 1.40 | 1.40 | 2.00 | 1.40 | 1.40 | 1.40 | 1.40 | 1.40 |
| MgO | — | 35.00 | 35.00 | 50.00 | 17.50 | — | 35.00 | — | — |
| ZnO | — | — | — | — | — | 70.00 | — | — | — |
| $MgHPO_4 \cdot 3H_2O$ | — | — | — | — | — | — | — | 52.50 | — |
| $CaHPO_4$ | — | — | — | — | 40.25 | — | — | — | 40.25 |
| Flexural Strength (Ksi) | 14.59 | 26.67 | 25.36 | 30.33 | 20.00 | 13.37 | 19.58 | 16.84 | 16.83 |
| Flexural Modulus (Msi) | 5.37 | 6.79 | 3.64 | 6.00 | 4.95 | 4.71 | 4.83 | 5.24 | 4.07 |

EXAMPLE 1

The alkali base, potassium hydroxide (KOH, 280.00 g) is dissolved in a diluted potassium silicate solution (Kasil-1, 570.50 g combined with 122.50 g of water) with gentle stirring. A surfactant is added (3.50 g, DBE-712, Gelest Inc., Morrisville, Pa.). Zinc chloride (15.75 g) is then added to potassium silicate solution. The silica fume (714.00 g) is combined with metakaolin (183.75 g) and potassium monobasic phosphate (92.75 g, $KH_2PO_4$). The powder blend is then transferred to a storage container and placed in cold storage (typically <0° C.).

EXAMPLE 2

The alkali base, potassium hydroxide (KOH, 262.50 g) is dissolved in a diluted potassium silicate solution (Kasil-1, 570.50 g combined with 144.38 g of water) with gentle stirring. A surfactant is added (3.50 g, DBE-712, Gelest Inc., Morrisville, Pa.,). Zinc chloride (15.75 g) is then added to potassium silicate solution. The following materials are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the potassium silicate solution and the mixture is allowed to mix for 1 hour. The mixture was then poured into a closed storage container and placed into a freezer. Carbon fabric was cut into 12"×12" segments. The resin mixture was removed from the freezer and allowed to warm to ambient temperature (about 20° C.). Eight segments were prepregged with the resin and then combined into a lay-up. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for three samples) was 26.67 Ksi and mean flexural modulus was 6.79 Msi.

EXAMPLES 3–9

Resin compositions were prepared according to the procedure shown in Example 2. The reactant amounts are shown in Table 1. The compositions were stored in closed containers at about 0° C. until needed.

EXAMPLE 10

The resin composition prepared in example 3 was removed from the freezer and allowed to warm to ambient temperature (about 20° C.). Unsized carbon fiber tow was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for two samples) was 78.25 Ksi and mean flexural modulus was 15.96 Msi.

EXAMPLE 11

The resin composition prepared in example 3 was removed from the freezer and allowed to warm to ambient temperature (about 20° C.). Nickel-coated carbon fiber tow (Besfight® MC, Toho Carbon Fibers, Inc. Menlo Park, Calif.) was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for three samples) was 116.74 Ksi and mean flexural modulus was 14.87 Msi.

EXAMPLE 12

The resin composition prepared in example 3 was removed from the freezer and allowed to warm to ambient temperature (about 20° C.). Stainless steel wire was immersed in the resin mixture and the resin was allowed partially cure. The resin-coated wire was carefully wrapped longitudinally along a mandrel ensuring that the strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for six samples) was 99.16 Ksi and mean flexural modulus was 10.95 Msi.

EXAMPLES 13–17

Glass Preparation:

The following example will serve to illustrate the preparation of a reactive glass for use in accordance with the present invention. The phosphoborate glass of example 10 is prepared as follows (reactants shown in Table 2):

1) The boric acid, monobasic sodium phosphate, monobasic potassium phosphate, ammonium monobasic phosphate, silicon dioxide and aluminum nitrate or their equivalents are combined, blended and ground as dry powders. If needed, a phosphate/boric acid or other masterbatch can be prepared and used to enhance consistency.
2) The blended mixture is transferred to an alumina or a silica crucible and placed in a muffle furnace. The mixture is then fined at a temperature sufficient for vitrification (approximately 900–1300° C.) for 2–15 hours. At completion of the fining step, the molten glass is poured onto a quench plate and allowed to cool. The glass is then broken into small pieces and ground to the desired particle size.
3) The glass can be post-treated thermally to limit irregularities in composition, morphology and reactivity.

TABLE 2

The formulations of the phosphoborate glasses described in Examples 13–17.

| Ingredient | Example 13 (g) | Example 14 (g) | Example 15 (g) | Example 16 (g) | Example 17 (g) |
|---|---|---|---|---|---|
| $B(OH)_3$ | 3645 | 3645 | 3186 | 3186 | 3228 |
| $NaH_2PO_4$ | 1571 | 1571 | 451 | — | 1120 |
| $NaH_2PO_4 \cdot H_2O$ | — | — | — | 519 | — |
| $KH_2PO_4$ | 891 | 891 | 519 | 519 | 640 |
| $NH_4H_2PO_4$ | 452 | 452 | — | — | — |
| $Al(PO_3)_3$ | — | — | 1895 | 1895 | 400 |
| $SiO_2$ | 361 | 361 | 260 | 260 | 320 |
| $Al_2O_3$ | — | 88 | — | — | — |
| $Al(NO_3)_3 \cdot 9H_2O$ | 783 | — | — | — | — |

The examples illustrate the preparation of the reactive glasses that will be used in examples 18–23 that follow. The glass is prepared by blending the ingredients shown in Table 2. The blended mixture is put into refractory crucibles and placed in a muffle furnace at the conditions described above. The glasses can also be prepared using glassmaking furnaces typically employed in the art. The molten glass in poured onto a quench plate and allowed to cool. The glass is then ground to the desired particle size.

EXAMPLE 18

Potassium hydroxide (322.00 g) is dissolved in a solution of Kasil-1 (570.50 g) and water (157.50 g) with stirring. Zinc chloride ($ZnCl_2$, 15.75 g) and a surfactant (DBE-712, 3.50 g) are then added to the silicate solution. The mixture is chilled to 3–5° C. and blend of silica fume (714.00 g), metakaolin (183.75 g), magnesium oxide (3.50 g) and acidic glass (78.75 g, as prepared in example 16) is then added to the mixture slowly with mixing. The mixture is stirred for an additional 30 minutes resulting in a material with a viscosity of approximately 2,000 cp. If needed, the mixture is allowed to set until the viscosity is suitable for application to the reinforcement medium (for example, fabric, chopped fiber, or wound filament) needed to construct the composite. The composite material can be prepared using any of the composite molding methods typically employed, The test specimen for this example was formed into a composite by a traditional prepreg/lay-up method. A "prepreg" is formed by impregnating a reinforcing medium or reinforcement with the matrix binder to produce a binder coated fabric sheet. The next step is to layer the individual prepregs together to achieve the desired thickness and/or shape. Next, the "layup" is placed into a mold to compact or consolidate the prepregs and to form the composite shape. Optionally, the prepregs could be subjected to a B-staging period and/or vacuum bagging to reduce the water content.

Carbon fiber composite panels were made using this formulation and compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for three samples) was 22.35 Ksi and mean flexural modulus was 6.68 Msi.

EXAMPLE 19

The resin composition prepared in Example 18 was removed from the freezer and allowed to warm to ambient temperature (about 20° C.). Unsized carbon fiber tow was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for five samples) was 44.28 Ksi and mean flexural modulus was 13.35 Msi.

EXAMPLE 20

The resin composition prepared in example 18 was removed from the freezer and allowed to warm to ambient temperature (about 20° C.). Nickel-coated carbon fiber tow was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for three samples) was 181.17 Ksi and mean flexural modulus was 16.73 Msi.

EXAMPLE 21

The resin composition prepared in example 18 was removed from the freezer and allowed to warm to ambient temperature (about 20° C.). Stainless steel wire was immersed in the resin mixture and the resin was allowed partially cure. The resin-coated wire was carefully wrapped longitudinally along a mandrel ensuring that the strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength). Mean flexural stress at yield (for three samples) was 140.96 Ksi and mean flexural modulus was 13.28 Msi.

EXAMPLE 22

The resin composition prepared in example 18 was removed from the freezer and allowed to warm to ambient temperature (about 20° C.). Nickel-coated carbon fiber tow was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength) and post-cured over an escalating temperature range from 90–450° C. Each sample was then subjected to a fixed load in a muffle furnace and the muffle temperature was gradually raised until the sample yielded. The sample failed at 450° C.

EXAMPLE 23

The resin composition prepared in example 18 was removed from the freezer and allowed to warm to ambient temperature (about 20° C.). Nickel-coated carbon fiber tow was immersed in the resin mixture and mechanically spread to enhance resin infiltration. Once the tow was infiltrated with the resin, the tow was carefully wrapped longitudinally along a mandrel ensuring that the tow strands remained parallel and encased in a mold. The mold was placed into an oven at 80° C. for 2 hours and then at 150° C. for 3 hours. The consolidated bar was removed from the mold and subjected to a freestanding post-cure at 80° C. for 1 hour. Samples were prepared for testing per ASTM specification D790 (flexural strength), however prior to testing the samples were immersed in a 15 wt. % solution of phosphoric acid for 1 hour. The samples were degassed in vacuo while immersed. The samples were then post-cured over an escalating temperature range from 90–450° C. Each sample was then subjected to a fixed load in a muffle furnace and the muffle temperature was gradually raised until the sample yielded. The treated sample failed at 481° C. This represents an increase of 31° C. over the non-treated sample.

EXAMPLE 24

The alkali base, potassium hydroxide (KOH, 262.50 g) is dissolved in a potassium silicate solution (Kasil-1, 570.50 g) with gentle stirring. A surfactant is added (3.50 g, DBE-712, Gelest Inc., Morrisville, Pa.). Zinc chloride (15.75 g) is then added to potassium silicate solution. The following powders are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the metal silicate solution and the mixture is allowed to mix for 1.0 hour. The mixture was then poured into a closed storage container and placed into a freezer. Unsized carbon fabric was cut into 12"×12" segments. The resin mixture was removed from the freezer and allowed to warm to ambient temperature (about 20° C.). Four segments were prepregged with the resin and then combined into a lay-up that was set aside for four hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for three samples) was 24.72 Ksi and mean flexural modulus was 6.44 Msi.

EXAMPLE 25

The alkali base, potassium hydroxide (KOH, 262.50 g) is dissolved in a potassium silicate solution (Kasil-1, 570.50 g) with gentle stirring. A surfactant is added (3.50 g, DBE-712, Gelest Inc., Morrisville, Pa.). Zinc chloride (15.75 g) is then added to potassium silicate solution. The following powders are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the potassium silicate solution and the mixture is allowed to mix for 0.5–1.0 hours. The mixture was then poured into a closed storage container and placed into a freezer. Unsized carbon fabric was completely immersed in a solution of 75 wt. % concentrated nitric acid (assay about 70%) and 25 wt. % concentrated sulfuric acid (assay about 95%) to increase the oxophilicity of the fiber surface and enhance the interfacial properties. After 72 hours the fabric was carefully removed and rinsed with deionized water. The acid-treated carbon fiber fabric was dried and cut into 12"×12" segments. The resin mixture was removed from the freezer and allowed to warm to ambient temperature (about 20° C.). Four segments were prepregged with the resin and then combined into a lay-up that was set aside for four hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for three samples) was 32.41 Ksi and mean flexural modulus was 7.35 Msi. This represents a 31% increase in flexural strength and a 14% increase in flexural modulus compared to panel prepared incorporating non-acid treated unsized carbon fabric.

EXAMPLE 26

The alkali base, potassium hydroxide (KOH, 253.75 g) is dissolved in a potassium silicate solution (Kasil-1, 570.50 g) with gentle stirring. A surfactant is added (3.50 g, DBE-712, Gelest Inc., Morrisville, Pa.). Zinc chloride (17.50 g) is then added to potassium silicate solution. The following powders are combined into a powder blend: silica fume (731.50 g), metakaolin (192.50 g), potassium monobasic phosphate (33.25 g, $KH_2PO_4$), boric acid (38.50 g $H_3BO_3$), aluminum hydroxide (1.75 g, $Al(OH)_3$) and magnesium oxide (43.75 g, MgO). The combined powder blend is then added to the potassium silicate solution and the mixture is allowed to mix for 0.5–1.0 hours. The mixture was then poured into a closed storage container and placed into a freezer. Unsized carbon fabric was completely immersed in a solution of 10 wt. % concentrated nitric acid (assay about 70%), 5 wt. % sodium nitrite ($NaNO_2$) and 5 wt. % sodium sulfate ($Na_2SO_4$) for ninety minutes and the fabric was carefully removed and placed in a muffle furnace heated to 350° C. for ninety minutes. After the treated fabric cooled, it was rinsed with deionized water. The treated carbon fiber fabric was dried and cut into 12"×12" segments. The resin mixture was removed from the freezer and allowed to warm to ambient temperature (about 20° C.). Four segments were prepregged with the resin and then combined into a lay-up that was set aside for three hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for three samples) was 35.21 Ksi and mean flexural modulus was 6.34 Msi. This represents a 42% increase in flexural strength compared to panel prepared incorporating non-acid treated unsized carbon fabric.

EXAMPLE 27

The resin composition prepared in example 1 was removed from the freezer and allowed to warm to ambient temperature (about 20° C.). The resin was applied to a stainless steel wool mat and this prepreg was placed between polyester sheets and put in a press at 80° C. and 250 psi for 3 hours and then at 110° C. and 250 psi for 1 hour. The composite panel was then removed from the press after cooling.

EXAMPLE 28

The resin composition prepared in example 15 was removed from the freezer and allowed to warm to ambient temperature (about 20° C.). The resin was applied to three plies of plain weave carbon fabric and two plies of woven glass fabric. The carbon and glass prepreg plies were then alternated when constructing the lay-up. The carbon-glass lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for three samples) was 29.51 Ksi and mean flexural modulus was 4.06 Msi.

TABLE 4

Borophosphate glass composition

| Ingredient | Example 29 |
|---|---|
| $NH_4H_2PO_4$ | 148.94 |
| $B(OH)_3$ | 6.36 |
| $MgCO_3$ | 8.73 |
| $BaCO_3$ | 5.11 |
| $Li_2(CO_3)_2$ | 15.31 |
| | (g) |

EXAMPLE 29

Borophosphate Glass Preparation

The following example will serve to illustrate the preparation of a reactive borophosphate glass for use in accordance with the present invention. The glass of example 29 is prepared as follows (reactants shown in Table 4):

1) The ammonium monobasic phosphate, boric acid, magnesium carbonate, barium carbonate and lithium carbonate or their equivalents are combined, blended and ground as dry powders. If needed, a phosphate/boric acid or other masterbatch can be prepared and used to enhance consistency.
2) The blended mixture is transferred to an alumina or a silica crucible and placed in a muffle furnace. The mixture is then fined at a temperature sufficient for vitrification (approximately 900–1300° C.) for 2–15 hours. At completion of the fining step, the molten glass is poured onto a quench plate and allowed to cool. The glass is then broken into small pieces and ground to the desired particle size.

The glass can be post-treated thermally to limit irregularities in composition, morphology and reactivity.

EXAMPLE 30

Potassium hydroxide (100.0 g) is dissolved in a solution of Kasil-1 (660.0 g) and water (190.0 g) with stirring. Lactic acid (6.0 g) and a surfactant are then added to the silicate solution. The mixture is chilled to 3–5° C. to which silica fume (840.0 g) is then added and allowed to mix thoroughly. A blend of metakaolin (60.0 g), magnesium oxide (40.0 g), potassium phosphate ($KH_2PO_4$, 16.0 g) and acidic glass (70.0 g, as prepared in example 29) is then added to the solution slowly with mixing. The mixture is stirred for an additional 30 minutes. The resin is then applied to glass fabric reinforcement and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for five samples) was 8.10 Ksi and mean flexural modulus was 2.59 Msi.

EXAMPLE 31

Potassium hydroxide (100.0 g) is dissolved in a solution of Kasil-1 (660.0 g) and water (200.0 g) with stirring. Lactic acid (6.0 g) and a surfactant are then added to the silicate solution. The mixture is chilled to 3–5° C. to which silica fume (840.0 g) is then added and allowed to mix thoroughly. A blend of metakaolin (64.50 g), magnesium oxide (64.50 g) and acidic glass (120.0 g, as prepared in example 29) is then added to the solution slowly with mixing. The mixture is stirred for an additional 30 minutes. The resin is then applied to glass fabric reinforcement and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for five samples) was 10.58 Ksi and mean flexural modulus was 2.25 Msi.

EXAMPLE 32

Potassium hydroxide (100.0 g) is dissolved in a solution of Kasil-1 (660.0 g) and water (150.0 g) with stirring. Lactic acid (4.60 g) and a surfactant are then added to the silicate solution. The mixture is chilled to 3–5° C. to which silica fume (840.0 g) is then added and allowed to mix thoroughly. A blend of metakaolin (64.50 g), magnesium oxide (64.50 g) and acidic glass (150.0 g, as prepared in example 29) is then added to the solution slowly with mixing. The mixture is stirred for an additional 30 minutes. The resin is then applied to glass fabric reinforcement and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for five samples) was 11.43 Ksi and mean flexural modulus was 2.36 Msi.

EXAMPLE 33

Potassium hydroxide (66.0 g) is dissolved in a solution of Kasil-1 (660.0 g) and water (193.88 g) with stirring. Citric acid (2.06 g) and a surfactant are then added to the silicate solution. The mixture is chilled to 3–5° C. to which a blend of silica fume (814.28 g), metakaolin (64.35 g), magnesium oxide (64.35 g), acidic borophosphate glass (30.0 g, as prepared in example 29) and acidic phosphoborate glass (18.56 g, as prepared example 13) is then added to the solution slowly with mixing. The mixture is stirred for an additional 30 minutes. The resin is then applied to glass fabric reinforcement and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for four samples) was 9.38 Ksi and mean flexural modulus was 2.81 Msi.

EXAMPLE 34

Potassium hydroxide (322.00 g) is dissolved in a solution of Kasil-1 (570.50 g) and water (145.25 g) with stirring. Zinc chloride ($ZnCl_2$, 15.75 g) is then added to the silicate solution. The mixture is chilled to 3–5° C. and blend of silica fume (714.00 g), metakaolin (183.75 g) and acidic glass (39.38 g, as prepared in example 16) is then added to the mixture slowly with mixing. The mixture is stirred for an additional 30 minutes resulting in a material with a viscosity of approximately 2,500 cp. Eight carbon fabric segments were prepregged with the resin and then combined into a lay-up that was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for four samples) was 20.85 Ksi and mean flexural modulus was 6.41 Msi.

EXAMPLE 35

The alkali base, potassium hydroxide (KOH, 262.50 g) is dissolved in a potassium silicate solution (Kasil-1, 570.50 g) with gentle stirring. A surfactant is added (3.50 g, DBE-712, Gelest Inc., Morrisville, Pa.). Zinc chloride (15.75 g) is then added to potassium silicate solution. The following powders are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the potassium silicate solution and the mixture is allowed to mix for 0.5–1.0 hours. The mixture was then poured into a closed storage container and placed into a freezer. Unsized carbon fabric cut into 12"×12" segments was coated with a 5 wt % aqueous suspension of polyvinyl alcohol (Celvol V-523, Celanese Ltd., Dallas, Tex.) and silica fume and allowed to dry. The resin mixture was removed from the freezer and allowed to warm to ambient temperature (about 20° C.). Four segments were prepregged with the resin and then combined into a lay-up that was set aside for three hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for five samples) was 35.39 Ksi and mean flexural modulus was 7.12 Msi. This represents a 43% increase in flexural strength and an 11% increase in flexural modulus compared to panel prepared incorporating unsized carbon fabric.

EXAMPLE 36

The alkali base, potassium hydroxide (KOH, 262.50 g) is dissolved in a potassium silicate solution (Kasil-1, 570.50 g) with gentle stirring. A surfactant is added (3.50 g, DBE-712, Gelest Inc., Morrisville, Pa.). Zinc chloride (15.75 g) is then added to potassium silicate solution. The following powders are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the potassium silicate solution and the mixture is allowed to mix for 0.5–1.0 hours. The mixture was then poured into a closed storage container and placed into a freezer. Unsized carbon fabric cut into 12"×12" segments was coated with a 5 wt % aqueous suspension of polyvinyl alcohol (210 parts Celvol V-523, Celanese Ltd., Dallas, Tex.), acidic reactive glass (180 parts, prepared in example 29) surfactant/defoamer (1 part) and silica fume (15 parts) and allowed to dry. The resin mixture was removed from the freezer and allowed to warm to ambient temperature (about 20° C.). Four segments were prepregged with the resin and then combined into a lay-up that was set aside for three hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for five samples) was 47.33 Ksi and mean flexural modulus was 7.33 Msi. This represents a 92% increase in flexural strength and a 14% increase in flexural modulus compared to panel prepared incorporating unsized carbon fabric.

EXAMPLE 37

The alkali base, potassium hydroxide (KOH, 262.50 g) is dissolved in a potassium silicate solution (Kasil-1, 570.50 g) with gentle stirring. A surfactant is added (3.50 g, DBE-712, Gelest Inc., Morrisville, Pa.). Zinc chloride (15.75 g) is then added to potassium silicate solution. The following powders are combined into a powder blend: silica fume (722.75 g), metakaolin (183.75 g), potassium monobasic phosphate (33.25 g, $KH_2PO_4$), boric acid (38.50 g $H_3BO_3$), aluminum hydroxide (1.40 g, $Al(OH)_3$) and magnesium oxide (35.00 g, MgO). The combined powder blend is then added to the potassium silicate solution and the mixture is allowed to mix for 0.5–1.0 hours. The mixture was then poured into a closed storage container and placed into a freezer. Unsized carbon fabric cut into 12"×12" segments was coated with a 5 wt % aqueous suspension of polyvinyl alcohol (210 parts Celvol V-523, Celanese Ltd., Dallas, Tex.) and surfactant/defoamer (1 part) and allowed to dry. The resin mixture was removed from the freezer and allowed to warm to ambient temperature (about 20° C.). Four segments were prepregged with the resin and then combined into a lay-up that was set aside for three hours prior to curing. The lay-up was then press-cured at 220 psi and 80° C. for 4 hours, 110° C. for 4 hours and 150° C. for 4 hours. After curing, the resulting panel was removed from the mold and subjected to a freestanding post-cure at 80° C. for 1 hour. Samples were prepared for testing per ASTM specification D790 (flexural strength). Mean flexural stress at yield (for five samples) was 44.60 Ksi and mean flexural modulus was 7.23 Msi. This represents an 80% increase in flexural strength and a 12% increase in flexural modulus compared to panel prepared incorporating unsized carbon fabric.

EXAMPLE 38

Potassium hydroxide (100.0 g) is dissolved in a solution of Kasil-1 (660.0 g) and water (300.0 g) with stirring. Lactic acid (6.00 g) and a surfactant are then added to the silicate solution. The mixture is chilled to 3–5° C. to which silica fume (840.0 g) is then added and allowed to mix thoroughly. The mixture can be stored in a freezer for use at later time at this point, if desired. A blend of metakaolin (64.50 g), magnesium oxide (64.50 g) and acidic glass (120.0 g, as prepared in example 29) is then added to the mixture slowly with mixing. The mixture is stirred for an additional 30 minutes. The resin is then applied to glass fabric reinforcement cut into 12"×12" segments and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for five samples) was 11.74 Ksi and mean flexural modulus was 2.67 Msi.

EXAMPLE 39

Potassium hydroxide (100.0 g) is dissolved in a solution of Kasil-1 (660.0 g) and water (300.0 g) with stirring. Lactic acid (6.00 g) and a surfactant are then added to the silicate solution. The mixture is chilled to 3–5° C. to which silica fume (840.0 g) is then added and allowed to mix thoroughly. The mixture can be stored in a freezer for use at later time at this point, if desired. A blend of metakaolin (64.50 g), magnesium oxide (64.50 g) and acidic glass (120.0 g, as prepared in example 29) is then added to the mixture slowly with mixing. The mixture is stirred for an additional 30 minutes. Glass fabric cut into 12"×12" segments was coated with a 5 wt % aqueous suspension of polyvinyl alcohol (210 parts Celvol V-523, Celanese Ltd., Dallas, Tex.), acidic reactive glass (180 parts, prepared in example 29) surfactant/defoamer (1 part) and silica fume (15 parts) and allowed to dry. The resin is then applied to glass fabric reinforcement and a multilayer prepreg lay-up is formed. The prepreg was then compression molded using standard composite processing parameters: curing at 225 psi and 80° C. for 4 hours, 110° C. for 4 hours and 150° C. for 4 hours. Samples were prepared for testing per ASTM specification D790 (flexural strength). Mean flexural stress at yield (for five samples) was 18.70 Ksi and mean flexural modulus was 2.80 Msi. This represents a 59% increase in flexural strength and a 5% increase in flexural modulus compared to panel prepared incorporating uncoated glass fabric.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. An inorganic polymer matrix composition, binder composition, or foam composition, comprising: the reaction product of an alkali silicate, one or more non-silicate oxoanionic compounds or a reactive acidic glass, or combinations thereof; water; and a reinforcing media comprising fibers, fabrics, or microspheres, or combinations thereof; and optionally one or more additives; and optionally one or more network modifiers.

2. An inorganic polymer matrix composition, binder composition, or foam composition, comprising: the reaction product of an alkali base; a silica source; and one or more non-silicate oxoanionic compounds or a reactive glass, or combinations thereof; water; and a reinforcing media comprising fibers, fabrics, or microspheres, or combinations thereof; optionally one or more network modifiers; and optionally one or more fillers.

3. The composition of claim 1, wherein said network modifiers comprises a cation.

4. The composition of claim 3, wherein said cation is a multivalent cation comprising Groups 2, 3, 4, 5, 6, 7, 8, 9, 10, 11, 12, 13, 14, 15, or 16 of the Periodic Table.

5. The composition of claim 3, wherein said cation is an alkaline earth cation.

6. The composition of claim 1, wherein said non-silicate oxoanionic compound comprises an acidic oxoanionic compound.

7. The composition of claim 6, wherein said acidic oxoanionic compound comprises boric acid, phosphoric acid, sulfuric acid, sodium dihydrogen phosphate, disodium hydrogen phosphate, dipotassium hydrogen phosphate, potassium dihydrogen phosphate, ammonium hydrogen phosphate, ammonium dihydrogen phosphate, metallic and/or nonmetallic phosphate salts or compounds incorporating borate, sulfate, aluminate, vanadate, germanate, or combinations thereof.

8. The composition of claim 1, wherein said non-silicate oxoanionic compound comprises a non-acidic oxoanionic compound.

9. The composition of claim 8, wherein said non-acidic oxoanionic compound comprises trisodium phosphate, potassium phosphate, or sodium borate.

10. The composition of claim 1, wherein said non-silicate oxoanionic compound comprises a mixture of potassium dihydrogen phosphate and boric acid; sodium dihydrogen phosphate and boric acid; potassium dihydrogen phosphate, sodium dihydrogen phosphate and boric acid; or sodium borate and potassium dihydrogen phosphate.

11. The composition of claim 1, wherein said non-silicate oxoanionic compound comprises monobasic potassium phosphate and boric acid.

12. The composition of claim 6, wherein said acidic oxoanionic compound is present in an amount of between about 0.01 wt. % and 20 wt. % based upon the total composition.

13. The composition of claim 1, wherein said reactive glass can be characterized by the following formula:

$$a(A'_2O)_x g(G_fO)_y c(A''O)_z$$

where A' represents at least one alkali metal glass modifier, $G_f$ represents at least one glass former, A" represents, optionally, at least one glass network modifier, a represents the number of fluxing agents present and ranges from 1 to 5, g represents the number of glass formers present and ranges from 1 to 10, c represents the number of glass network modifiers and ranges from 0 to about 30, x represents the mole fraction of fluxing agent and is between about 0.050 and about 0.150, y represents the mole fraction of glass former and is between about 0.200 and about 0.950, z represents the mole fraction of glass network modifiers and is between about 0.000 and about 0.500, x+y+z=1, and x<y.

14. The composition of claim 13, wherein said alkali glass modifier comprises lithium, sodium, potassium, rubidium, cesium or combinations thereof.

15. The composition of claim 14, wherein said glass former comprises boron, silicon, phosphorus, sulfur, germanium, arsenic, antimony, aluminum, vanadium or combinations thereof.

16. The composition of claim 15, wherein said glass network modifier comprises, titanium, chromium, manganese, iron, cobalt, nickel, copper, mercury, zinc, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, or combinations thereof.

17. The composition of claim 1, wherein said optional additives comprise clay fillers, oxide fillers, gel modifiers, organic toughening agents, or plasticizing agents or combinations thereof.

18. The composition of claim 17, wherein said fillers comprise kaolin, metakaolin, montmorillonites or mica or combinations thereof.

19. The composition of claim 17, wherein said oxide filler is magnesium oxide, zinc oxide or calcium oxide or combinations thereof.

20. The composition of claim 17, wherein said gel modifier is an organic acid or base comprising hydroxyacids, nitrogen-containing bases, or phosphorus-containing bases, or combinations thereof.

21. The composition of claim 17, wherein said gel modifier comprises α-hydroxyacids, β-hydroxyacids, substituted pyridines, quinolines or combinations thereof.

22. The composition of claim 1, wherein said reinforcing fibers comprise nickel fibers, nickel-coated carbon fibers, nickel-coated graphite fibers, glass fibers, carbon fibers, graphite fibers, mineral fibers, oxidized carbon fibers, oxidized graphite fibers, steel fibers, metallic fibers, metal-coated carbon fibers, metal-coated glass fibers, metal-coated graphite fibers, metal-coated ceramic fibers; quartz fibers, ceramic fibers, silicon carbide fibers, stainless steel fibers, titanium fibers, nickel alloy fibers, polymeric fibers, aramid fibers, basalt fibers, alkaline resistant glass fibers or combinations thereof.

23. The composition of claim 1, wherein said fibers possess an oxophilic surface.

24. The composition of claim 1, wherein said fibers are coated to enhance oxophilicity.

25. The composition of claim 1, wherein said fibers are in the form of yarns, tows, whiskers, continuous fibers, short fibers, woven fabrics, knitted fabrics, non-woven fabrics, random mats, felts, braided fabrics, or wound tows.

26. A matrix, binder, or foam composition, comprising:

$$(1-n)(aA_2O:SiO_2:bB:cC:dD_x) \cdot nH_2O$$

wherein:
$A = (1-z)K_2O$ or $(z)Na_2O$, where z varies between 0 and 1, $K_2O$ is potassium oxide, and $Na_2O$ is sodium oxide; $Li_2O$ is optionally added,
$SiO_2$ is silica or a combination of various silicas;
$H_2O$ is water;
a=molar ratio of $A_2O:SiO_2$, which ranges from 0.05 to 1.0,
b=molar ratio of $B:SiO_2$, which ranges from 0.001 to 0.500,
c=molar ratio of $C:SiO_2$, which ranges from 0.0 to 0.250,
d=is the molar ratio of $D:SiO_2$ and ranges from 0.0 to 2.000,
n=molar ratio of $H_2O$ incorporated into the formulation, for which during initial formulation which ranges from 0.10 to 0.90,
x=the number of additives (D) used to aid in processing and performance of the basic formulation and ranges from 0 to 20,
B=non-silicate oxoanionic compound or a reactive acidic glass, or combinations thereof,
C=network modifiers $Mg^{2+}$, $Ca_{2+}$, $Zn^{2+}$, $Al^{3+}$, $Ti^{4+}$ derived from multivalent main group metal and/or transition metal compounds, $Mg(NO_3)_2$, $ZnCl_2$, or a combination thereof or as a metallic component of a reactive glass, and
D=optional additives selected from the group consisting of
(i) reactive fillers or nonreactive fillers or combinations thereof;
(ii) gelation modifiers;
(iii) a surface-active agents selected from the group consisting of an anionic, cationic or nonionic surfactants or combinations thereof; and
(iv) organic-containing toughening agents or plasticizing agents or combinations thereof, and
a reinforcing media comprising fibers, fabrics, or microspheres, or combinations thereof.

27. The composition of claim 26, wherein said non-silicate oxoanionic compound comprises phosphate, sulfate, or borate groups.

28. The composition of claim 26, wherein said non-silicate oxoanionic compound is derived from an acidic precursor.

29. The composition of claim 28, wherein said acidic precursor comprises $H_3PO_4$, $H_2SO_4$, $H_3BO_3$ or a combination thereof.

30. The composition of claim 29 wherein said acidic precursor comprises salts derived from $H_3PO_4$, $H_2SO_4$, $H_3BO_3$ or a combination thereof.

31. The composition of claim 28, wherein said reactive glass comprises an alkali borophosphate or an alkali phosphoborate glass or combinations thereof.

32. The composition of claim 28, wherein said surface active agents comprise alkylaryl sulfonates, quaternary ammonium salts, protonated organoamine salts, hydroxy polymers, organosilicones, or combinations thereof.

33. The composition of claim 28, wherein said fillers comprise kaolin, smectites, hormites, mica, vermiculite, metakaolin, metal oxides or a combination thereof.

34. The composition of claim 28, wherein said gelation modifiers comprise an organic base or an organic acid or a combination thereof.

35. The composition of claim 34, wherein said organic base is quinoline.

36. The composition of claim 34, wherein said organic acid is lactic acid or citric acid or a combination thereof.

37. The composition of claim 1 wherein said polymer matrix, or binder, or foam, is coated with a solution to enhance thermal stability or hydrolytic stability or a combination thereof.

38. The composition of claim 37, wherein said solution is a solution of phosphoric acid.

39. The composition of claim 37, wherein said solution is a solution of phosphoric acid and one or more metallic salts.

40. The composition of claim 37, wherein said solution is a solution of a magnesium salt and phosphoric acid.

41. The composition of claim 37, wherein said solution contains a polyvalent metallic salt comprising aluminum, calcium, zinc, cerium, lanthanum, or combinations thereof.

42. The composition of claim 37, wherein said solution contains a polyvalent metallic salt comprising aluminum, calcium, zinc, cerium, lanthanum or phosphoric acid.

43. The composition of claim 37, wherein said solution contains a monovalent metallic salt comprising lithium hydmxide, lithium acetate, or lithium chloride.

44. The composition of claim 28, wherein said matrix, or binder, or foam, is coated with a solution to enhance thermal or hydrolytic stability.

45. The composition of claim 26, wherein said matrix, or binder, or foam, is coated with a solution to enhance the thermal and hydrolytic stability.

46. The composition of claim 45, wherein said solution is a solution of phosphoric acid.

47. The composition of claim 45, wherein said solution is a solution of phosphoric acid and one or more metallic salts.

48. The composition of claim 44, wherein said solution is a solution of a magnesium salt and phosphoric acid.

49. The composition of claim 44, wherein said solution contains a polyvalent metallic salt comprising aluminum, calcium, zinc, cerium, or lanthanum, or combinations thereof.

50. The composition of claim 44, wherein said solution contains a polyvalent metallic salt comprising aluminum, calcium, zinc, cerium, or lanthanum, or phosphoric acid, or combinations thereof.

51. The composition of claim 45, wherein said solution contains a monovalent metallic salt comprising lithium hydroxide, lithium acetate, or lithium chloride.

52. The composition of claim 1 comprising said polymer matrix, binder, or foam, and said reinforcement having an enhanced level of mechanical strength where the reinforcement exhibits an oxophilic character at the interface formed between the polymer matrix and reinforcement.

53. The composition of claim 1 comprising said polymer matrix, binder, or foam, and a graphite and carbon reinforcement having an enhanced level of mechanical strength due to an improved interface formed between the polymer matrix and reinforcement, wherein said reinforcement is treated by chemical oxidation.

54. The composition of claim 1 comprising said polymer matrix, binder, or foam, and a graphite and carbon reinforcement having an enhanced level of mechanical strength due to the interface formed between the polymer matrix and reinforcement, wherein said reinforcement is treated by thermal oxidation.

55. The composition of claim 7 comprising said polymer matrix, or binder, or foam, and a graphite or carbon reinforcement having an enhanced level of mechanical strength due to an improved interface formed between the polymer matrix and reinforcement, wherein said reinforcement is treated by chemical oxidation.

56. The composition of claim 7 comprising said polymer matrix, binder, or foam, and a graphite or carbon reinforcement having an enhanced level of mechanical strength due to the interface formed between the polymer matrix and reinforcement, wherein said reinforcement is treated by thermal oxidation.

57. The composition of claim 1 comprising said polymer matrix, binder, or foam, and said reinforcement having an enhanced level of mechanical strength due to the interface formed between the polymer matrix and reinforcement, wherein said reinforcement is treated by metallization.

58. The composition of claim 1 comprising said polymer matrix, binder, or foam, and a graphite and carbon reinforcement having an enhanced level of mechanical strength due to the interface formed between the polymer matrix and reinforcement, wherein said reinforcement is treated by electrolytic oxidation.

59. The composition of claim 7 comprising said polymer matrix, or binder, or foam, and a graphite or carbon reinforcement having an enhanced level of mechanical strength due to the interface formed between the polymer matrix and reinforcement, wherein said reinforcement is treated by electrolytic oxidation.

60. The composition of claim 1 comprising said polymer matrix, binder, or foam, and said reinforcement having improved interfacial strength.

61. A composition of claim 52, wherein said oxophilic character is the result of a sizing applied to the reinforcement.

62. A composition according to claim 61, wherein said sizing is an organic-inorganic hybrid sizing.

63. A composition according to claim 61, wherein said sizing comprises an organic polymer and an inorganic oxide particulate.

64. A composition according to claim 61, wherein said sizing comprises polyvinyl alcohol and silica.

65. A composition according to claim 61, wherein said sizing comprises an epoxy and glass frit.

66. A composition according to claim 61, wherein said sizing comprises an epoxy and a reactive glass frit.

67. A composition according to claim 61, wherein said sizing comprises polyvinyl alcohol and a reactive glass frit.

68. The composition of claim 1 comprising said polymer matrix, or binder, or foam, and said reinforcement having an enhanced level of mechanical strength due to the interface formed between the polymer matrix and the reinforcement, wherein said reinforcement has an irregular or roughened surface or a combination thereof.

69. An inorganic polymer matrix, binder, or reinforced or non-reinforced foam composition comprising an alkali silicate, and a reactive boron containing glass.

70. An inorganic polymer matrix, binder, or reinforced or non-reinforced foam of claim 69 wherein said reactive glass comprises an acidic phosphoborate glass.

71. An inorganic polymer matrix, binder, or reinforced or non-reinforced foam of claim 69 wherein said reactive glass comprises an acidic borophosphate glass.

72. An inorganic polymer matrix, binder, or reinforced or non-reinforced foam of claim 69 wherein said reactive glass comprises an acidic phosphoborate and acidic borophosphate glass.

73. An inorganic polymer matrix, binder, or reinforced or non-reinforced foam composition comprising an alkali silicate and potassium dihydrogen phosphate.

74. The composition of claim 7 comprising said alkali silicate, and wherein the reinforcement exhibits an oxophilic character at the interface formed between the polymer matrix and reinforcement.

75. The composition of claim 7 comprising said alkali silicate, and wherein the reinforcement exhibits an oxophilic character at the interface formed between the polymer matrix and reinforcement wherein said reinforcement is treated by metallization.

76. The composition of claim 13 comprising a carbon or graphite reinforcement and said alkali silicate wherein the reinforcement exhibits an oxophilic character at the interface formed between the polymer matrix and reinforcement wherein said reinforcement wherein said reinforcement is treated by chemical oxidation.

77. The composition of claim 13 comprising a carbon or graphite reinforcement and said alkali silicate wherein the reinforcement exhibits an oxophilic character at the interface formed between the polymer matrix and reinforcement wherein said reinforcement wherein said reinforcement is treated by thermal oxidation.

78. The composition of claim 13 comprising a carbon or graphite reinforcement and said alkali silicate wherein the reinforcement exhibits an oxophilic character at the interface formed between the polymer matrix and reinforcement wherein said reinforcement wherein said reinforcement is treated by electrolytic oxidation.

79. The composition of claim 1 comprising said alkali silicate, wherein the reinforcement exhibits an oxophilic character at the interface between the matrix, binder, or foam and the reinforcement as a result of the application of sizing to the reinforcement.

80. A composition according to claim 79, wherein said sizing comprises an organic polymer and an inorganic oxide particulate.

81. A composition according to claim 79, wherein said sizing comprises polyvinyl alcohol and silica.

82. A composition according to claim 79, wherein said sizing comprises epoxy and glass frit.

83. A composition according to claim 79, wherein said sizing comprises epoxy and a reactive glass frit.

84. A composition according to claim 79, wherein said sizing comprises polyvinyl alcohol and a reactive glass frit.

85. A composition according to claim 79, wherein the reinforcement comprises carbon fibers, graphite fibers or combinations thereof.

86. A composition according to claim 68, wherein the reinforcement comprises glass.

87. A reinforced inorganic polymer matrix, binder, or foam composition comprising a reinforcement and an alkali silicate wherein the reinforcement exhibits an oxophilic character at the interface between the matrix and the reinforcement as a result of a sizing comprising polyvinyl alcohol being applied to the reinforcement.

88. A reinforced inorganic polymer matrix, binder, or foam composition comprising a reinforcement and an alkali silicate and wherein the reinforcement exhibits an oxophilic character at the interface between the matrix and the reinforcement as a result of a primer comprising polyvinyl alcohol being applied to the reinforcement.

89. A reinforced inorganic polymer matrix, binder, or foam composition comprising a reinforcement and an alkali silicate wherein the reinforcement exhibits an oxophilic character at the interface between the matrix and the reinforcement as a result of polyvinyl alcohol being applied to the composition.

90. A reinforced inorganic polymer matrix, binder, or foam composition comprising reinforcement and an alkali silicate wherein the reinforcement exhibits an oxophilic character at the interface between the matrix and the reinforcement as a result of a sizing comprising crosslinked polyvinyl alcohol being applied to the reinforcement.

91. A reinforced inorganic polymer matrix, binder, or foam composition comprising a reinforcement and an alkali silicate wherein the reinforcement exhibits an oxophilic character at the interface between the matrix and the reinforcement as a result of a primer comprising crosslinked polyvinyl alcohol being applied to the reinforcement.

92. A reinforced inorganic polymer matrix, binder, or foam composition containing a reinforcement comprising a reaction product of an alkali silicate and a phosphoborate glass, wherein the reinforcement exhibits an oxophilic character at the interface between the matrix and reinforcement.

93. A glass composition comprising about 10 mol % to about 50 mol % of phosphorus pentoxide or its salts, acids or precursor forms; about 10 mol % to about 70 mol % of boron oxide; about 5 mol % to about 45 mol % of an alkali oxide and from about 0 mol % to about 30 mol % of an alkaline earth oxide.

94. A glass composition comprising about 20 mol % to about 40 mol % of phosphorus pentoxide or its salts, acids or precursor forms; about 30 mol % to about 60 mol % of boron oxide; about 20 mol % to about 40 mol % of an alkali oxide and from about 5 mol % to about 20 mol % of an alkaline earth oxide.

95. A glass composition comprising about 25 mol % to about 35 mol % of phosphorus pentoxide or its salts, acids or precursor forms; about 45 mol % to about 55 mol % of boron oxide; about 15 mol % to about 30 mol % of an alkali oxide and from about 10 mol % to about 15 mol % of an alkaline earth oxide.

96. A reinforced inorganic polymer matrix, binder, or reinforced or non-reinforced foam composition containing a reinforcement comprising a reaction product of an alkali silicate and the glass composition of claim 93, wherein the reinforcement exhibits an oxophilic character at the interface between the matrix and reinforcement.

97. A reinforced inorganic polymer matrix, binder, or reinforced or non-reinforced foam composition containing a reinforcement comprising a reaction product of an alkali silicate and the glass composition of claim 94, wherein the reinforcement exhibits an oxophilic character at the interface between the matrix and reinforcement.

98. A reinforced inorganic polymer matrix, binder, or reinforced or non-reinforced foam composition containing a reinforcement comprising a reaction product of an alkali silicate and the glass composition of claim 95, wherein the reinforcement exhibits an oxophilic character at the interface between the matrix and reinforcement.

* * * * *

UNITED STATES PATENT AND TRADEMARK OFFICE
CERTIFICATE OF CORRECTION

PATENT NO. : 7,094,285 B2 Page 1 of 1
APPLICATION NO. : 10/777885
DATED : August 22, 2006
INVENTOR(S) : Anthony M. Mazany et al.

It is certified that error appears in the above-identified patent and that said Letters Patent is hereby corrected as shown below:

Column 34,
    Claim 25, line 2, please correct the word "yams", should be --yarns--

Column 37
    Claim 76, line 17, please delete the second "wherein said reinforcement".
    Claim 77, line 23, please delete the second "wherein said reinforcement".
    Claim 78, line 29, please delete the second "wherein said reinforcement".

Signed and Sealed this

Fifth Day of December, 2006

JON W. DUDAS
*Director of the United States Patent and Trademark Office*